US012598272B2

(12) United States Patent
Higgins et al.

(10) Patent No.: US 12,598,272 B2
(45) Date of Patent: Apr. 7, 2026

(54) PT/PT-Z CAMERA COMMAND, CONTROL AND VISUALIZATION SYSTEM AND METHOD UTILIZING ARTIFICIAL INTELLIGENCE

(71) Applicant: Digital Path, Inc., Chico, CA (US)

(72) Inventors: Ethan Higgins, Chico, CA (US); James A. Higgins, Chico, CA (US); Scott Schifando, Chico, CA (US); Jeremiah Lang, Chico, CA (US)

(73) Assignee: Digital Path, Inc., Chico, CA (US)

( * ) Notice: Subject to any disclaimer, the term of this patent is extended or adjusted under 35 U.S.C. 154(b) by 68 days.

(21) Appl. No.: 18/363,566

(22) Filed: Aug. 1, 2023

(65) Prior Publication Data

US 2024/0214527 A1     Jun. 27, 2024

Related U.S. Application Data

(63) Continuation-in-part of application No. 17/814,632, filed on Jul. 25, 2022, now Pat. No. 12,309,340.

(Continued)

(51) Int. Cl.
| | |
|---|---|
| *H04N 7/18* | (2006.01) |
| *G06V 10/774* | (2022.01) |
| *G06V 20/52* | (2022.01) |
| *H04N 23/62* | (2023.01) |
| *H04N 23/661* | (2023.01) |
| *H04N 23/695* | (2023.01) |
| *H04N 23/698* | (2023.01) |

(52) U.S. Cl.
CPC ........... *H04N 7/181* (2013.01); *G06V 10/774* (2022.01); *G06V 20/52* (2022.01); *H04N*

*23/62* (2023.01); *H04N 23/661* (2023.01); *H04N 23/695* (2023.01); *H04N 23/698* (2023.01)

(58) Field of Classification Search
CPC .. H04N 13/111; H04N 13/167; H04N 13/282; H04N 23/698; H04N 23/90; H04N 23/60
USPC .............................. 348/36, 42, 143, 152, 153
See application file for complete search history.

(56) References Cited

U.S. PATENT DOCUMENTS

| | | | | |
|---|---|---|---|---|
| 8,284,254 B2 * | 10/2012 | Romanowich | ..... | H04N 7/17318 382/103 |
| 8,400,502 B2 * | 3/2013 | Zakrzewski | .......... | G06F 18/256 348/122 |

(Continued)

*Primary Examiner* — Thai Q Tran
*Assistant Examiner* — Stephen R Smith
(74) *Attorney, Agent, or Firm* — FisherBroyles, LLP; Rob L. Phillips

(57) ABSTRACT

System and method for collection, control and display of cameras and images. Software may direct the cameras to targeted images automatically or manually. Artificial Intelligence (AI) may be used to identify targets and automatically direct one or more cameras to focus on a target. Images taken by one or more cameras may then be stored and displayed for later viewing or live streamed. AI may be used to analyze images (Hits) to (i) determine if such Hits are objects of interest; (ii) determine if the Hits are related to an existing Incident; (iii) if determining a Hit is related to an Incident, create a new Filter and associating the new Filter with the Incident; and (iv) if determining the Hit is unrelated to an Incident, create a new Filter, associate the Hit with the Filter and use such information to train the artificial intelligence.

28 Claims, 13 Drawing Sheets

Related U.S. Application Data

(60) Provisional application No. 63/260,788, filed on Aug. 31, 2021.

(56) References Cited

U.S. PATENT DOCUMENTS

| | | | | |
|---|---|---|---|---|
| 9,652,860 | B1 * | 5/2017 | Maali | G06T 7/155 |
| 10,636,173 | B1 * | 4/2020 | Beach | G06V 10/82 |
| 10,931,920 | B2 * | 2/2021 | Springer | G08B 13/1963 |
| 10,997,423 | B1 * | 5/2021 | Borras | H04N 23/90 |
| 11,482,256 | B2 * | 10/2022 | Qin | G11B 27/10 |
| 11,678,011 | B1 * | 6/2023 | Fu | H04N 21/8549 |
| | | | | 348/143 |
| 11,792,507 | B1 * | 10/2023 | Di Febbo | G06V 20/52 |
| | | | | 348/262 |
| 2012/0079406 | A1 * | 3/2012 | Medhurst | H04N 23/62 |
| | | | | 715/769 |
| 2012/0206606 | A1 * | 8/2012 | Marchese | G08B 13/19606 |
| | | | | 348/143 |
| 2012/0281095 | A1 * | 11/2012 | Trenciansky | H04N 7/18 |
| | | | | 348/143 |
| 2013/0021433 | A1 * | 1/2013 | Belsarkar | G08B 13/19682 |
| | | | | 348/36 |
| 2017/0223314 | A1 * | 8/2017 | Collings, III | G01S 5/18 |
| 2017/0336858 | A1 * | 11/2017 | Lee | H04N 23/64 |
| 2018/0012462 | A1 * | 1/2018 | Heitz, III | G06V 40/20 |
| 2020/0034989 | A1 * | 1/2020 | Koyama | H04N 13/246 |
| 2021/0360201 | A1 * | 11/2021 | Hu | H04N 23/61 |
| 2022/0269885 | A1 * | 8/2022 | Wixson | G06T 7/70 |
| 2022/0272255 | A1 * | 8/2022 | Xiong | H04N 23/695 |

* cited by examiner

100

200

300

Example #1 – Sequential Clockwise or Counter Clockwise Image Captures

360 Degrees

0 Degrees        Camera Azimuth

400

| Image #1 taken by camera | Image #2 taken by camera | Image #3 taken by camera | Image #4 taken by camera |

Example #2 – Nonsequential Image Captures to Optimize Camera Movements

360 Degrees

0 Degrees        Camera Azimuth

425

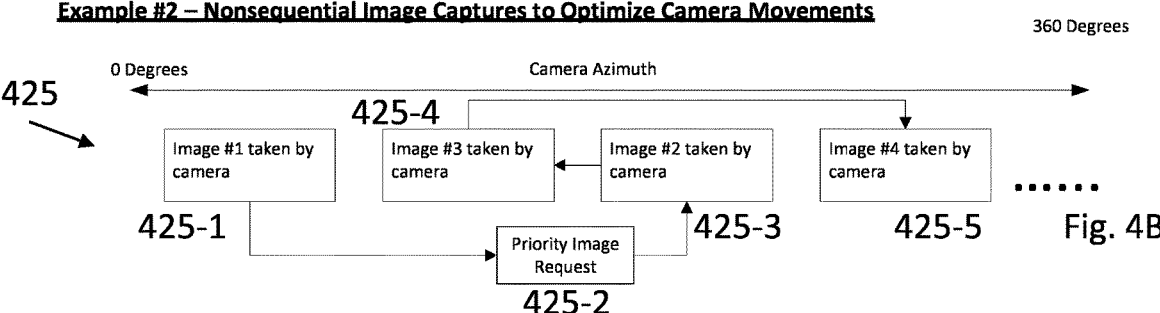

425-4

| Image #1 taken by camera | Image #3 taken by camera | Image #2 taken by camera | Image #4 taken by camera |

425-1        425-3        425-5        Fig. 4B

Priority Image Request 425-2

Example #3 – Stacked Image Capture

360 Degrees

0 Degrees        Camera Azimuth

450

Camera Elevation

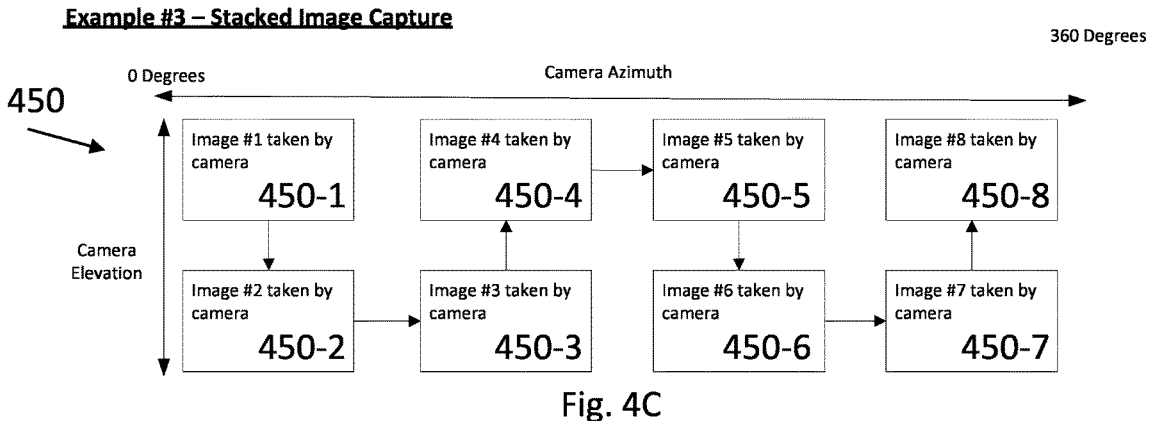

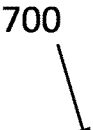

705 | A user or AI searches for a target location, selects a target location on a map or selects a group of cameras | → | The C&C System determines which cameras are near the requested target location | → | The C&C system commands those cameras to turn to view the target location (shown below) | 715

710

Map showing 4 cameras turned towards a target location

Target Location    Camera 3

Camera 1

Camera 2    Camera 4

720

System displays image quilt from camera 1-4 vantages

725-1    Camera 1 Image

Target location as viewed from Camera 1

725-2    Camera 2 Image

Target location as viewed from Camera 2

725-3    Camera 3 Image

Target location as viewed from Camera 3

725-4    Camera 4 Image

Target location as viewed from Camera 4

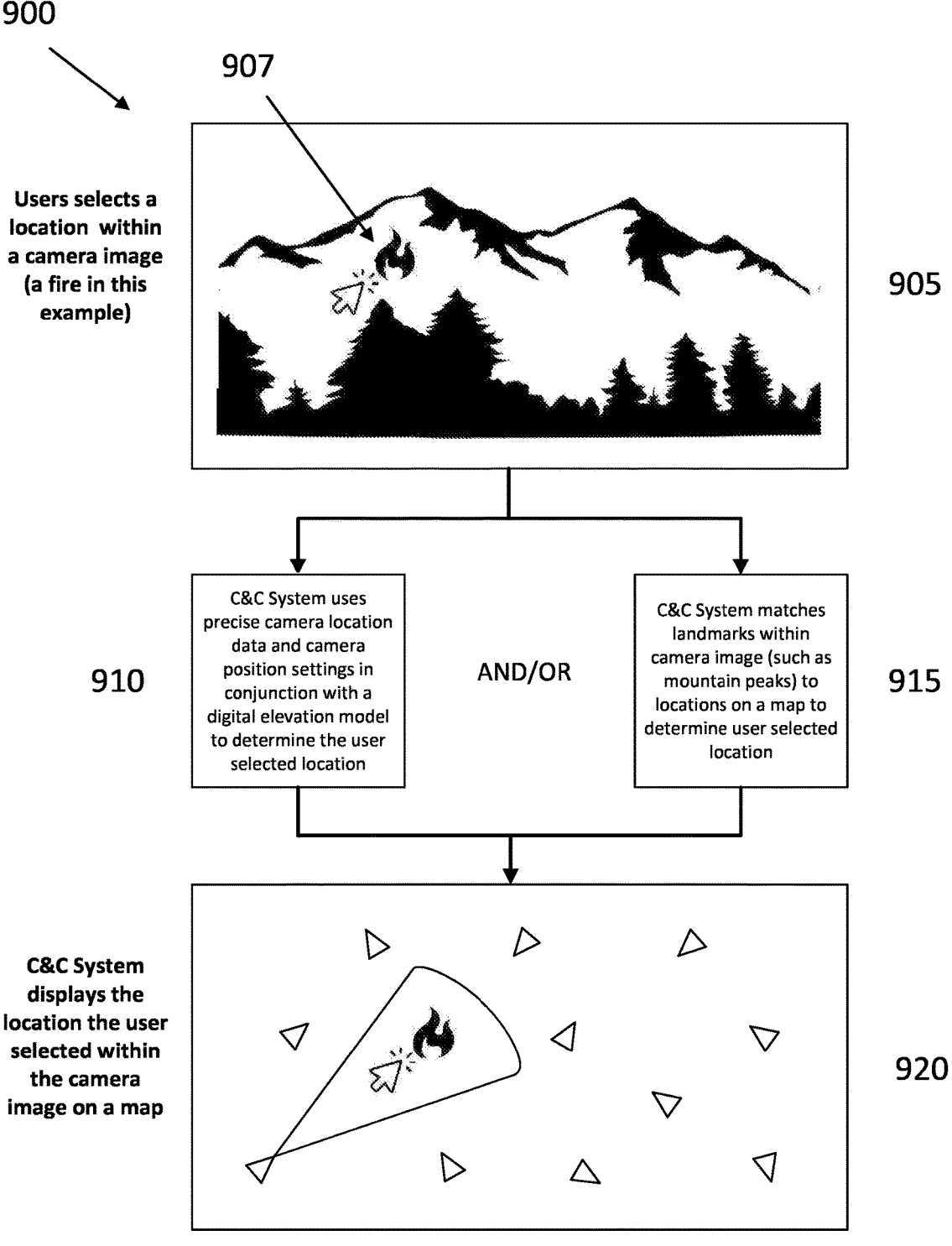

Users selects a location within a camera image (a fire in this example)

905

C&C System uses precise camera location data and camera position settings in conjunction with a digital elevation model to determine the user selected location

910

AND/OR

C&C System matches landmarks within camera image (such as mountain peaks) to locations on a map to determine user selected location

915

C&C System displays the location the user selected within the camera image on a map

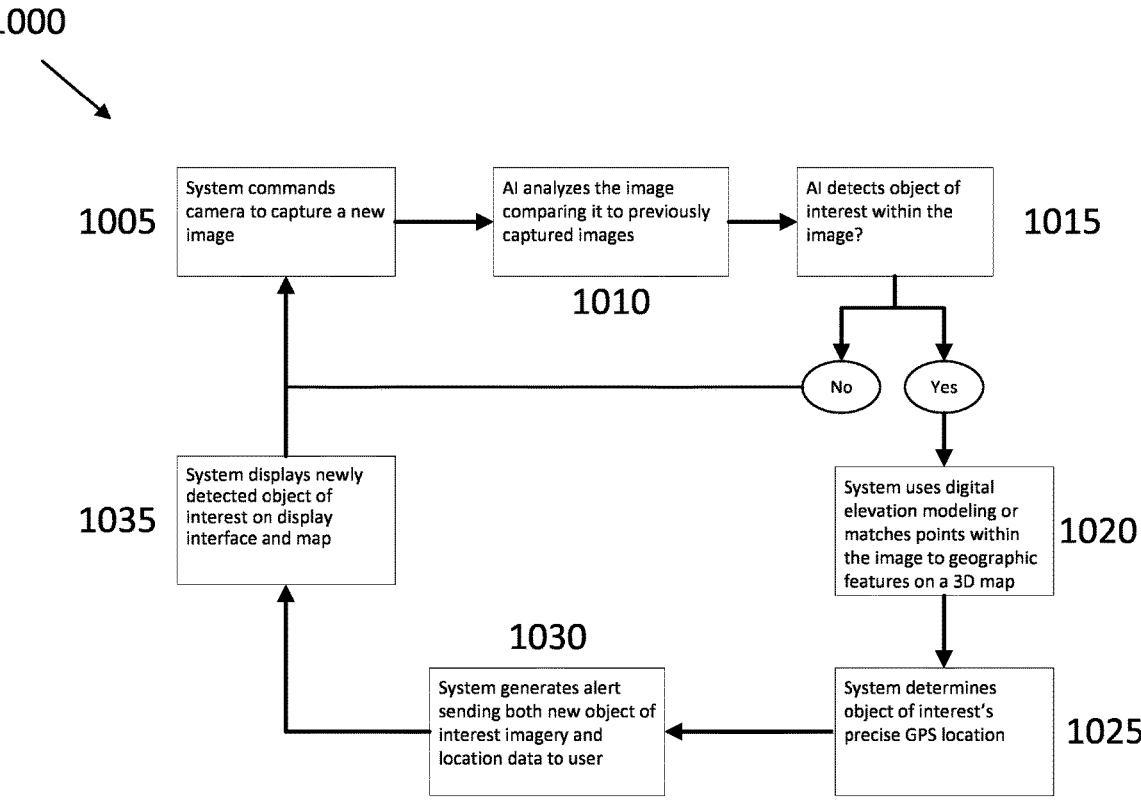

1005  System commands camera to capture a new image

1010  AI analyzes the image comparing it to previously captured images

1015  AI detects object of interest within the image?

No          Yes

1020  System uses digital elevation modeling or matches points within the image to geographic features on a 3D map 1025  System determines object of interest's precise GPS location 1030  System generates alert sending both new object of interest imagery and location data to user 1035  System displays newly detected object of interest on display interface and map

1105   AI Object Detection

1110   Weather data

1115   Land coverage data

1120   Fuel mapping

1125   Location data from other cameras

1130   Other Desired Data

1135   Historical data

Data uploaded to C&C System for user visualization   1145

AI predictive analysis of how object will change over time   1140

AI retrains based on data collected, adds collected data to historical data for future use   1150

PT/PT-Z CAMERA COMMAND, CONTROL AND VISUALIZATION SYSTEM AND METHOD UTILIZING ARTIFICIAL INTELLIGENCE

CROSS-REFERENCE

This application claims priority to U.S. patent application Ser. No. 17/814,632 filed on Aug. 16, 2022, which claims priority to U.S. Patent Application No. 63/260,788 filed on Aug. 31, 2022, both of which are incorporated herein for all purposes.

FIELD OF THE INVENTION

The embodiments of the present invention relate to software and systems used to monitor and remotely control a network of visual, audio, and meteorological data capturing devices, augment device functionality, process data, display data and allow users and devices to upload data to improve user situational awareness.

SUMMARY

The embodiments of the present invention broadly contemplate the use of various types of digital cameras, command and control software and systems (C&C system or C&C systems), $3^{rd}$ party system inputs, machine learning, artificial intelligence and a method and system to visually display data. The system may be used for a multitude of reasons including, but not limited to, providing rapid enhanced situational awareness for the public, emergency command centers, first responders responding to wildfires or other natural disasters, or other entities or situations where this system may be desired. This information may be used to make real-time decisions, such as determining when to evacuate a town in the path of a fire, deploying fire resources to a newly developed spot fire, and where to prioritize aircraft fire retardant drops. Digital cameras utilized may capture various wavelengths across the electromagnetic spectrum. Cameras may be located within various networks worldwide (including in outer space), may be mobile, attached to a vehicle (including aircraft) or affixed to a structure. Camera functionality types may include static, pan, tilt, and zoom or some combination thereof. Cameras may communicate with C&C systems over various network topologies and configurations.

The C&C systems may perform a variety of functions including, but not limited to, manually or automatically scheduling, capturing, processing, storing, sorting, displaying, retrieving, transmitting data, and communicating with 3rd party systems directly or through an Application Programming Interface (API). The C&C system may virtualize cameras in a way to provide scheduled image acquisition allowing multiple users and/or systems to simultaneously view their respective target areas from the same camera or cameras without interrupting other system or users' image capture requests. Said scheduled image acquisition may include panoramic image creation utilizing one or more images or videos captured by one or more cameras at one or more locations and combining said image(s) or video(s) to form a new panorama with up to a 360-degree field of view. Said C&C system may provide the ability for a C&C system user, the C&C system, a $3^{rd}$ party system or Artificial Intelligence (AI) to dynamically or statically select multiple points within an image, panoramic image, video or on a map and use those points to build a camera patrol pattern or collection of images in a vertical and/or horizontal grid manner to create an image quilt (quilt or quilts) that may be displayed and/or updated at desired time intervals. Said software, systems and functions may generate quilts by selecting desired camera names, camera icons or defining an area on a map then displaying one or more images, panoramic images, and/or videos where displayed imagery may be real-time, historical snap shots in time or a playback of timelapse imagery. During quilt timelapse playbacks, a user may view a single camera image full screen and then collapse the image back into the quilt without stopping the timelapse playback.

The embodiments of the present invention may improve emergency services resource allocation and response times. For example, during a 911 call for a new fire detection, dispatchers can type in GPS coordinates, an address, point of interest, intersection or any other location into the C&C system which may then move some or all cameras within a certain distance of the entered location to view the location, capture one or more images per camera, and then generate an image quilt displaying all the individual camera images simultaneously. The camera images may then update on a periodic basis. Camera images or videos may be projected onto two-dimensional (2D) or three-dimensional (3D) digital elevation models, street maps, satellite maps, elevation maps, or terrain maps to help emergency services personnel to quickly direct resources to the location or object of interest. The C&C system may allow users to click on a location on a 2D or 3D map or image to turn cameras to that location to capture one or more image(s) or video(s). The C&C system may utilize AI or Machine Learning (ML) to identify, detect, measure, locate, sort, alert, track, and/or display objects of interest such as fire or smoke. As used herein, Artificial intelligence is technology that enables a machine to simulate human behavior while machine learning is a subset of AI which allows a machine to automatically learn from past data without programming explicitly. Once detected, the C&C system may extract object boundaries by comparing historical and current visual data then analyze and predict the object's future change in direction, position, size, temperature, and movement over time, such as a fires growth path. Weather data may also be incorporated into fire growth modeling such as factoring in wind direction, wind speed, humidity and pressure levels utilizing field deployed sensors that report into the C&C system. Current and projected locations of objects of interest may be displayed on some form of map or other image. The C&C system may also prioritize, sort, select, unselect and/or display camera images or locations based on a user or system selected map area, an identified location of interest, AI object detection, satellite heat signature detection, camera user login counts, image view counts, or last moved cameras. The C&C system may also track, log, display and export all user actions within the system on a per camera, per user, per company, or global basis to improve user collaboration, situational awareness and possibly prevent camera control conflicts between users.

The embodiments of the present invention may include, but are not limited to, applications in fire surveillance, security surveillance, aircraft flight planning, animal behavior (such as migration patterns), seasonal, climate, vegetation, metrological and environmental changes. Weather data, topographic maps, satellite imagery, 2D maps, 3D maps, landmarks, messages, or any other desired information may be overlaid on camera images, videos or panoramic images created by the system or shown independent of the image elsewhere within a user's display. A user's geographic location may be identified from their personal device (such as a cell phone or tablet) GPS receiver and utilized within the C&C system to track users and display data relevant to the user's location. Users may be able to share their location and upload photos or video for others to see in the C&C system. Users may also share images, videos, timelapses, quilts, weather data or any combination thereof with other system users, or the public by copying or sharing a web link or posting directly to social media sites. The C&C system and image acquisition software may be installed and operated on any type of device or network capable of operating said software.

Other variations, embodiments and features of the present invention will become evident from the following detailed description, drawings, and claims.

BRIEF DESCRIPTION OF THE DRAWINGS

FIGS. 4A-4C illustrate various exemplary camera movement sequences to generate up to a three hundred sixty (360) degree panoramic image according to the embodiments of the present invention;

FIG. 7 illustrates a flow chart detailing how a user may search for a target location or click on a map to cause cameras to turn to view the target location and generate an image quilt according to the embodiments of the present invention;

FIG. 9 illustrates a flow chart detailing how a user may identify a location on a map from a camera image according to the embodiments of the present invention;

FIG. 10 illustrates a flow chart detailing how AI may be utilized to analyze images to detect, locate and alert users when a new object of interest is identified according to the embodiments of the present invention;

DETAILED DESCRIPTION

Figure 1:
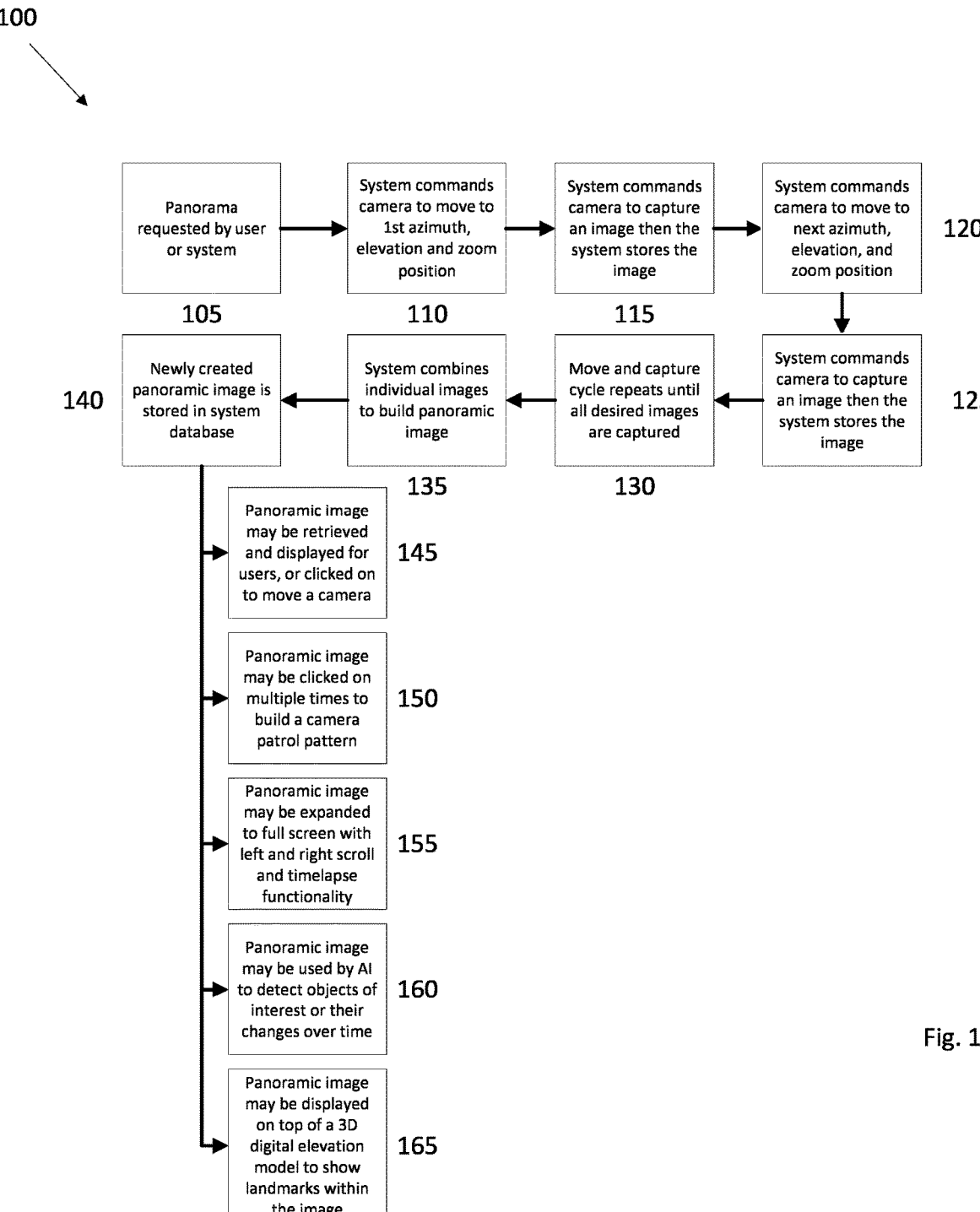
FIG. 1 illustrates one process for generating a panoramic image, store it in a database and various ways the panoramic images may be used within the system according to the embodiments of the present invention.

The embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention may be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Applicant herein incorporates by reference for any and all purposes U.S. Pat. No. 6,831,921 entitled "Wireless Internet Access System," U.S. Pat. No. 9,838,065 entitled "Methods and Systems for High-Capacity Wireless Broadband Delivery," U.S. Patent Application No. 62/607,871 entitled "Wireless Internet Access System and Method of Using the Same," U.S. Pat. No. 11,006,297 entitled "Wireless Remote Monitoring System and Data Collection and Control and Method of Using the Same" and U.S. Patent Application No. 63/260,788 entitled "PT/PT-Z Camera Command, Control & Visualization System and Method."

CAMERA TYPES, LOCATIONS, USES—The embodiments of the present invention utilize one or more visual data capturing device(s) ("Camera" or "Cameras") such as Pan Tilt (PT), Pan Tilt Zoom (PTZ), electronic Pan Tilt Zoom (ePTZ), Forward Looking InfraRed (FLIR), Multispectral and/or Hyperspectral cameras. Fixed Cameras such as security cameras, or doorbell cameras may also be incorporated into the C&C system and may employ digital ePTZ zoom to simulate movements to the extent possible. Cameras may be temporarily or permanently affixed to a structure, semi portable such as on a towable trailer that is setup at a desired location and later removed, configured to be air lifted and set into place at a desired vantage point via a helicopter, mounted to any sort of mobile vehicle including, but not limited to, cars, trucks, motorcycles, ATVs, UTVs, boats, airplanes, helicopters, and drones, or fully portable such as a user's mobile device (cell phone, laptop, tablet) and may be located and operate anywhere from underground or under water and into outer space. Cameras may be connected to and located within one or more internal, public, $3^{rd}$ party, or stand-alone network(s) worldwide. Cameras may be permanently installed throughout a geographic area or temporarily installed during an event such as a fire or other natural disaster. Cameras may receive power from the utility grid, battery, solar, wind, generator or any other power producing source. Camera imagery and data may be stored and accessed in a database or in some other data storage system (database) such as on the camera hardware, an onsite server, a server cluster, a remote server on the Internet, within a private network, or on a cloud service such as AWS. Camera data may include, but is not limited to, physical Camera data such as equipment type, serial number, make/model, GPS location, mounting structure type, site owner information, mobile camera or user location history, location elevation, Camera elevation or height above or below ground level, Camera software data such as firmware version, network configuration information, uptime, downtime, configuration files and other network performance data. Other data may also be derived and stored from the Camera(s) software, image(s), or video(s). Extracted data examples include, but are not limited to, Camera zoom level, azimuth, elevation angle, resolution, contrast, day/night mode, camera type (visual, near infrared, or IR), image and video timestamp(s), audio recordings, infrared temperature ranges by area within image(s) or video(s), last time a Camera moved or time duration since last movement, home location, patrol mode points, frame capture rate, text or image camera overlays, ambient temperature, fire perimeter boundary(ies), fire hot spot location(s) within image(s) or video(s), and/or other objects of interest and/or data. Collectively the visual image or video and derived data are referenced as "image" or "video" herein and meant to include both the visual image or video and derived data as they may be used within the C&C system.

C&C SYSTEM NETWORK DESIGN—One or more Cameras may be configured to communicate directly or indirectly with one or more image acquisition Servers and/or C&C systems using one or more fiber, wired or wireless (including cellular or satellite) connections. Camera(s) may be configured for direct access using publicly accessible IP addresses with or without firewall rules for security or configured for private access using Private IP addresses and may use some form of protocol such as IEEE 802.1Q for security and communication with C&C systems that may be located on other networks. The C&C system and image acquisition software may be installed and operated on any type of device or network capable of operating said software including, but not limited to, one or more local network(s), remote location(s), physical server(s), virtualized server(s), cloud service(s) (such as AWS), browser window(s), user device(s) (such as a PC, laptop, tablet, or cellphone), or directly on the Camera(s) hardware and software.

IMAGE ACQUISITION SERVERS MOVING CAM-ERAS/NETWORK DESIGN—The embodiments of the present invention may allow coordinated and scheduled visual data acquisition requests to be made via user(s), software, and/or machine input(s) to accommodate many different needs from one or more Camera(s) simultaneously. The C&C system or a user may utilize existing camera APIs and Software Development Kits (SDKs), $3^{rd}$ party APIs, the C&C system, physical servers, cloud hosted servers, AI, satellite data, and weather data or some combination thereof to sequentially or simultaneously move one or more Camera(s) to one or more static or dynamically generated position(s) based on user specified criteria, or the C&C system to may utilize various inputs to determine these dynamic Camera positions in real-time. As the C&C system requests one or more camera(s) to move to one or more new target location(s), the C&C system may extract image(s) and/or video(s), Camera orientation, user control data and any other desired information from the one or more camera(s). The C&C system may use one or more Servers including cloud Servers to: store images and/or videos, control camera movements and image acquisition, operate the C&C system, perform AI functions, and provide user access and display data. The Server(s) may operate independently or cooperatively and may be set up redundantly. The system may utilize one or more image acquisition Servers to collect one or more image(s) or video(s) from one or more camera(s) and forward them to a database or other Server for storage, review, and/or analysis. To reduce latency and improve image acquisition rates, image acquisition Servers may be located as close to Cameras as possible. By scheduling all visual data needs, Camera efficiency may be maximized and allow for different use needs to be simultaneously accommodated. A C&C system may utilize more than one image acquisition Server or cluster of Servers if different subsets of Cameras are located on different networks, which may ensure that an image acquisition Server is always as close as possible to each Camera or subset of Cameras. The image acquisition Server(s) may also manage user requests or requests from an image acquisition scheduler to move and/or control the camera or cameras connected to the image acquisition Server. Visual data acquisition requests include, but are not limited to, one-time captures, recurring captures at specific or random time intervals, $3^{rd}$ party captures, C&C system captures by users controlling Cameras, AI captures, user or C&C system generated manual or automatic panorama generations and/or visual data requests of a specific location for Cameras during a 911 call. The C&C system may prioritize requests based on defined priorities. A user or system request may be prioritized above other pending requests and cause the Camera(s) to immediately deliver an image or video to the user or system before returning to the queue of Camera image or video acquisitions scheduled to be collected. A timing mechanism or scheduler may be used to prevent too many users or system requests from delaying other pending and prioritized requests. Acquisition requests may utilize an API that routes each request to one or more image acquisition schedulers, the scheduler(s) then determine the optimal one or more image acquisition Server(s) to route the request based on the network(s) on which the desired Camera(s) are located. Once the Camera network(s) are determined, the scheduler commands the Camera(s) to orient themselves to the desired vantage point(s), capture the targeted image(s) or video(s), then transmit the visual data to the C&C system. The C&C system then store and display the visual data for one or more user(s), send the data to internal or $3^{rd}$ party AI/ML algorithms to scan for, detect, display and/or alert on any newly found objects of interest, or to store the visual data in a historical image archive for later retrieval by various users, websites and/or analysis by various systems.

Now referring to FIG. 1, flow chart 100 shows a process for generating a panoramic image, store it in a database and various ways the panoramic images may be used within the system according to the embodiments of the present invention. At 105, a panorama is requested by a user or the system. At 110, the system commands the camera to the first azimuth, elevation and zoom position. At 115, the system commands an image to be captured and then stores the image. At 120, the system commands the camera to the next azimuth, elevation and zoom position. At 125, the system commands an image to be captured and then stores the image. At 130, the system repeats the camera movements until all images are captured and stored. At 135, the system combines the images to build the panoramic image. At 140, the panoramic image is stored. Steps 145-165 show various actions that can be taken with the panoramic image. At 145, the panoramic image may be displayed and clicked on to move a camera. At 150, the panoramic image may be displayed and clicked on multiple times to build a camera patrol pattern. At 155, the panoramic image may be expanded to full screen with left and right scroll and timelapse functionality. At 160, the panoramic image may be used by AI to detect objects of interest or their changes over time. At 165, the panoramic image may be displayed on top of a 30 digital elevation model to show landmarks within the image.

Figure 2:
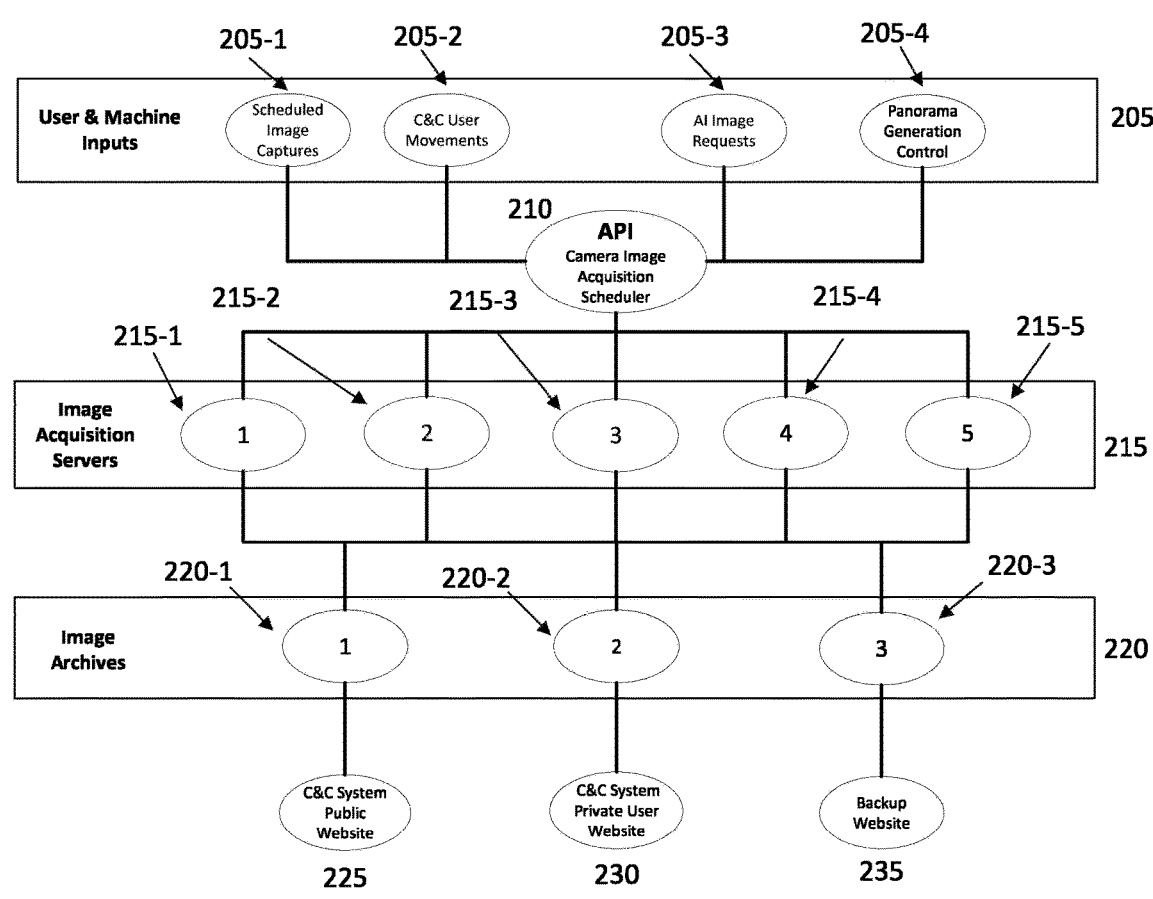
FIG. 2 illustrates an exemplary C&C system network design according to the embodiments of the present invention.

Cameras, the C&C system, and the system network design may be redundantly configured to maintain high levels of availability. For larger scale users or system visual data needs, Content Distribution Networks (CDNs) may be implemented to scale data delivery as necessary. Now referring to FIG. 2, an exemplary C&C system network design 200 is shown according to the embodiments of the present invention. In one embodiment, user and machine inputs 205 comprise scheduled image captures 205-1, C&C user movements 205-2, all image requests 205-3 and panorama generation control 205-4. Those skilled in the art will recognize that other user and machine inputs may be incorporated. The user and machine inputs communicate with a plurality of image acquisition servers 215 comprising servers 215-1 through 215-5 via the camera image capture scheduler 210. The image acquisition servers 215-1 through 215-5 communicate with a plurality of image archives (e.g., databases) 220 comprising archives 220-1 through 220-3. The system archives 220-1 through 220-3 may be accessed via a C&C public website 225, C&C private user website 230 and backup website 235.

Figure 3:
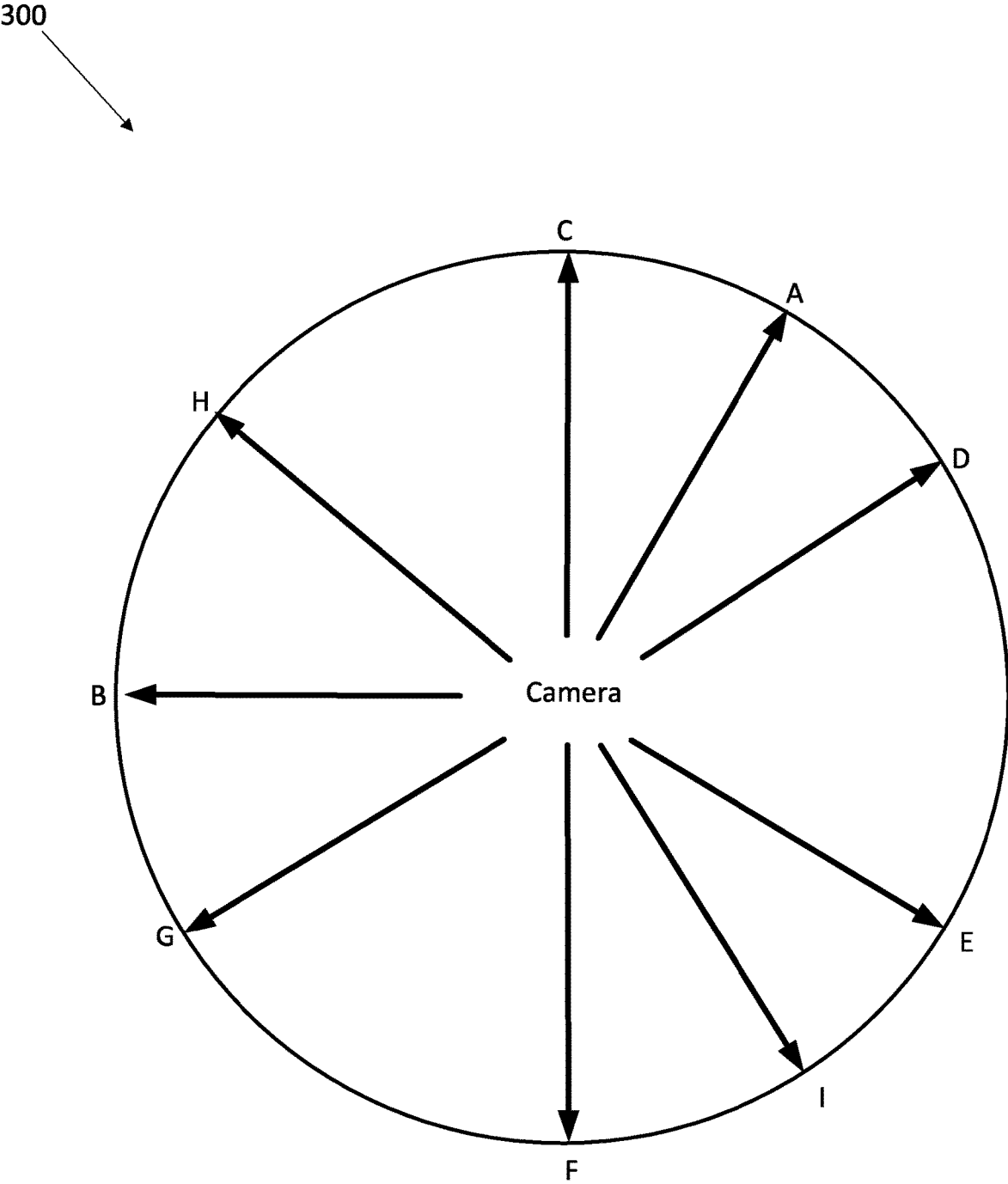
FIG. 3 illustrates how various user requests to move a camera may be prioritized and scheduled according to the embodiments of the present invention.

IMAGE ACQUISITION SCHEDULER—The image acquisitioned through the C&C system to control one or more cameras, each task may be assigned a priority, time, azimuth, elevation and/or zoom setting. The image acquisition scheduler may schedule tasks within a defined time interval and the image acquisition scheduler may have one or more of the cameras perform additional tasks in between scheduled tasks, as necessary. Now referring to FIG. 3, a camera 300 may be scheduled, via the image acquisition scheduler 210, to perform a series of tasks shown as A through I. The additional tasks may include building panoramic images, AI requests to scan areas for objects of interest, tracking animal or environmental changes over time or any other desired use. Priority use of the C&C system may be assigned to certain users or system uses or detected objects of interest, such as when AI detects a fire. The C&C system may limit access, override a scheduled task, or not allow a user or $3^{rd}$ party system to request a task (temporarily or permanently) if the request conflicts with a priority use or user of the camera or a priority object of interest. This control may be initiated through the C&C System, image acquisition Server, or database.

USER LOGIN/ACCESS—The C&C system may control access to the C&C system through authentication methods including, but not limited to, username, email address, phone number, email domain name, IP address, QR code, passcode, and/or username/password authentication. Users may have the ability to reset their password by receiving a password reset code via text, phone call or email. The C&C system may allow various account levels to be created, edited, updated, and/or deleted including, but not limited to, user, company, group, group administrator, and super user level accounts. Account and access level information may be logged and stored in the system including, but not limited to, name, username, phone number, mailing address, job title, company name, default group, group administrator status, individual or global camera control and priority level attributes and historical activity. Historical activity may include user/group/company camera movements, successful and unsuccessful login attempts and other interactions with the system encompassing logging for all aspects of a user's use of the C&C system.

CAMERAS/GROUPS/GROUP ADMINISTRATION— The C&C system may allow a user to access one or more Cameras, be added or removed from one or more user groups, and/or added or removed from one or more camera groups. Cameras may be added or removed from one or more users, cameras may be added or removed from one or more user groups or some combination thereof. Users may be assigned various permission level attributes for an individual camera, within a camera group, or on a global level. Group administrators may be assigned to one or more groups and may be able to add, modify, or remove users or camera access levels within their group. Group permission level attributes may be categorized in a numerical format such as 1-10 or 1-100 based on what permissions are granted or excluded. Group permission level attributes may include, but are not limited to, active or deactivated user status flags, camera or group or incident or global chat permissions, ability to view cameras, ability to move cameras, ability to request panoramic images, ability to set up camera patrol modes, ability to request live video feeds, ability to lock camera controls to prevent lower priority users or uses from moving cameras, allow root level camera access, ability to setup messages that may display within the C&C system (such as emergency evacuation messages), a subset of C&C system users, $3^{rd}$ party system users or to the public. These permission attribute levels may be visually displayed in the C&C system allowing group or system administrators to quickly toggle user or group access levels on or off by clicking a button or sending a command to the C&C system. Users, group administrators and/or system administrators may have the ability to visually see what cameras a user and/or group have privileges to access within the C&C system. As an option, a user, group administrator or system administrator may have the ability to click a cameras icon on a map to add or remove said camera from a user, user group or camera group. The C&C system may display a user's: location, access levels, camera control permissions, and priority levels using different icons, shapes, map/icon colors, text indicators or various other types of identifying features on the display interface. The C&C system may display said above items directly on displayed images and/or maps to indicate to users their various access levels. User, company, or Camera group areas may be designated by one or more shape areas or perimeters on a map including, but not limited to, rectangles, circles, and/or polygons. Cameras within said areas may be automatically added to a user, company, or group on a temporary or permanent basis. Cameras may also be automatically added to user or company groups based on company jurisdiction areas which may be shown on maps using various map overlays. This may be useful when new cameras are installed and operational, eliminating the need for system administrators to add each new camera to every camera group and user group affected by the new camera being added to the C&C system. As another option a certain subset of users or all users may automatically be assigned certain permissions by the C&C system based on their detected GPS location. This may be useful if, for example, a firefighter is assigned to a fire outside the firefighter's normal operating area. In this situation the C&C system may automatically assign the firefighter permission to move cameras within a certain number of miles of their GPS location until the firefighter leaves the area and returns to their normal operating area.

Navigation Bar—The C&C system interface may include multiple components including a navigation bar. Within the navigation bar or elsewhere in the C&C system, users may be able to access certain functionality including, but not limited to, a clickable button to login to the system, contact information, a ticketing system (for user communications, support, feature and bug fix requests), user permission modification, user agreements, user code of conduct, incident management, onboarding of new cameras into the system, camera movement logs, user login attempts and session logs, a user's or group's cameras access list or map, user profile and account information, user management, weather data, bulk data management, a calendar to request or conduct user training, reports for system and network performance including offline cameras, and a page to manage network connection providers or other agencies responsible for installing and maintaining specific cameras. One or more interfaces may display a search bar to allow users to search for: cameras by name, GPS coordinates, address, or geographic location. Additionally, cameras may be searched by their proximity to a specific location such as a road intersection or other specific location. The navigation bar may have a clickable button or logo to return the user to the home page from any page within the system.

MAP TYPES/LAYERS/FUNCTIONALITY—The C&C system may utilize one or more maps to provide spatial and situational awareness to users. Maps may be displayed anywhere throughout the system. Maps may have the ability to expand to full screen or scaled back into the page from which it was expanded. Maps may include the ability to toggle on and off various icons, images, map types, and map layers. Icons may be manually sized or automatically resize as users zoom in or out on the map and map icons may change color based on user access levels or camera status. Icon examples include, but are not limited to, cameras, arrows, GPS location tear drops, house shapes to depict home locations, colored Wi-Fi symbols, rectangle/circle/ polygons, and "+" and "−" zoom level icons. Examples of map types include, but are not limited to, roads, 2D and 3D street/satellite/terrain/topographic, 3D digital elevation models or some combination thereof. Map layer examples include, but are not limited to, camera targets, camera viewsheds, online and offline cameras, active fire incidents, current and historical fire perimeters, Integrated Reporting of Wildland-Fire Information (IRWIN), fire agency direct protection areas, Office of Emergency Services regions, fire agency region boundaries such as local, State and Federal fire units, County & State Boundaries, National Forest Boundaries, high fire threat areas such as the California Public Utilities High Fire Threat Tier 2 and Tier 3 areas, weather sensor location and data such as data obtained from MesoWest, static or dynamic wind flow visualizations, user and equipment GPS locations including mobile equipment (such as bulldozers, water tenders, fire engines and aircraft), Aircraft ADS-B transponder locations, critical infrastructure, and utility operating areas and infrastructure (including transmission/distribution lines/gas pipelines). Maps may also incorporate the ability to display an icon showing a user's location on a map. The C&C System may zoom the map into a static or dynamically sized area around the user's location. The C&C system may also have a clickable button to "display cameras images near me" within a user or system generated distance from the user or allow a user to click a button to generate an image quilt of nearby cameras or even click a button to watch a timelapse of all cameras near the user simultaneously. Map legends may be displayed permanently or toggled on and off by a user or system.

OVERLAYS—MAP AND IMAGE—The C&C system may incorporate a home page with one or more maps, images and/or text overlays, examples include, but are not limited to, weather data, landmarks, messages, user warn-ings, incident areas, GPS locations, area selector tools, timers, weather or environmental data or any other desired information may be overlaid on camera images, videos and/or panoramic images created by the system or shown independent of the image elsewhere within a user's display. The overlaid data may be limited to data pertinent to the area displayed on an image or video or an identified geographic location. Dynamic overlays may be used on camera streams and extracted images or panoramic images to display real-time information to enhance the user experience and situational awareness. These dynamic overlays include, but are not limited to, near real-time or real-time weather data, points of interest, maps, satellite imagery, sensor alarms, external alarm databases and other statistics. These dynamic overlays may become integrated into the image or video and be available for replay as static images, videos, or time-lapse playback.

HOME PAGE—PAGE LAYOUT/MAP/IMAGE TILES—The display interface may have some form of map for user navigation as well as display a grid of image tiles showing current or historical views from cameras within the current map display boundary area. As a user clicks and drags to move the map or zooms in or out on the map, the displayed image tiles may automatically adjust to show updated camera image tiles based on cameras located within the updated map boundary area. Each time a user moves a map, this process may repeat and display new image tiles. The display interface may allow camera or camera site names to be displayed over or near their respective camera image(s) and toggled on or off via a clickable button. As an option, the display interface may divide image tiles into various areas on the display. For example, one area of the display may show the four most recently moved cameras including displaying the duration of time since each of the four cameras was last moved and by which user or system. Another area of the display may show additional camera image tiles where some or all tiles may be prioritized, sorted, selected, unselected, or displayed in various ways such as in alphabetical order, closest distance to a user's GPS or home location or object of interest, most recently moved, most visited, most viewed, most logged in current or historical users, displayed map area, identified locations or objects of interest determined by a user of AI, AI detection counts, or satellite heat signatures. As another option individually displayed image tiles may be expanded to full screen by clicking a button. Clicking the same button or another button may collapse the image back into the tile display area. A user may also click a button to initiate a historical timelapse playback on an individual or group of camera image tiles. From this display interface, a user may also click on a camera image to take the user directly to that camera's console page to control the camera if the user has appropriate permissions.

CAMERA ICONS & ICON MOVEMENT—Maps within the C&C system may display camera locations and camera orientation directions by displaying one or more camera directional icons on a map for each camera within the field of view. Each camera icon or directional icon may be placed at the specific GPS location on the map where that camera is located. Camera icons and/or directional icons may rotate around the GPS location based on the current or historical compass direction of a camera. When a camera is moved by the C&C system, user, AI, or a $3^{rd}$ party system or through an API, that camera's direction may update on one, several or all maps in real time or near-real time. Camera icons and/or directional icons may be displayed as different colors or shapes for different users based on a user's assigned access level to view or move the camera(s). For example, if a user's access level allows the user to move a camera, the camera icon or directional icon may display in a green color but if the user is not able to move the camera but only view the camera, the icon may display in some other color such as blue. In situations where a camera may be virtualized, more than one camera icon or directional icon may be displayed for a single camera showing the multiple directions a camera is returning image feeds for.

CAMERA TARGET LINES—The C&C system maps may incorporate camera target lines and the ability to toggle one, some, or all target lines on or off via use of a toggle, button or camera icon. Target lines may extend a user or system defined distance (such as 10 or 20 miles) from one or more camera locations in whatever direction the camera is currently (or historically during timelapse playback) oriented. Target lines are useful to help system users and the public visualize exactly where each camera is pointed. When two or more cameras from different locations are pointed at the same target location (such as a fire), triangulation may be possible. The greater number of cameras pointed at the same target location may result in a higher degree of target location accuracy. The C&C system may allow users to quickly determine exact target location coordinates by clicking on a map where target lines intersect to display a pin and a popup textbox on the map that may include GPS coordinates which the user may be able to copy and/or share with other C&C system users within their company, group, all C&C system users or with the public including additional options for common social media channel buttons. The C&C system may determine the exact target location via the use of AI, ML or other method, and display the target location coordinates for use by users, the public, the C&C system, or other systems. As another option, camera target lines may automatically be displayed on a map based on when each camera was last moved (AI or system movements such as patrol modes may be included or excluded from automatically being displayed), camera target lines may change color based on how recently a camera was last moved. For example, the target line for a camera moved within the previous 15 minutes may be displayed in red, the target line for a camera moved within the previous 30 minutes may be displayed in orange and the target line for a camera moved within the previous hour may be displayed yellow. This method of displaying camera target lines may help reduce map clutter by not displaying irrelevant camera target lines where the cameras have not recently been moved towards an object of interest. As another option, cameras that have not moved for a duration of time longer than the pre-established time defined for display by a defined color may display black camera arrows and target lines or may not be displayed at all to cause recently moved cameras to standout on the map. In another embodiment, users may have the option to select and display a map overlay (showing camera arrows, camera target lines and/or other data) and an image thumbnail grid, where both the map and image thumbnail grid only display cameras moved within a certain time period, said time period may be pre-established by the C&C system or user selectable. This option may allow users and/or the public to display only recently moved cameras (greatly reducing clutter compared to displaying all cameras) to help users and/or the public to quickly detect the cameras that have been moved towards an object of interest (such as a fire) and ignore cameras that have not recently moved. Additionally, when C&C system users have moved multiple cameras to view an object of interest, the cameras' corresponding target lines may triangulate at the object of interest's location on the map providing the ability for C&C system users and/or the public to click on the map at the intersection of the target lines to display the object's GPS coordinates and distance from the user's location (if the C&C system is able to detect the user's location). Some form of measuring tool may also be available on the map allowing a user to click on multiple points on the map and determine the distance between them. As another option, once cameras are directed towards an object of interest (such as a fire), the C&C system may automatically detect the object of interest via AI. Once two or more cameras are displaying the object of interest, the C&C system may automatically alert certain users about the location of the object of interest. As another option, users may be able to hover their cursor over camera target lines and the C&C system may display a current camera image. This may be useful to determine which target lines are viewing an object of interest and which target lines are not.

CAMERA VIEWSHED CONES—Camera viewsheds may be represented on a map, maps or an image or images by a cone shape. Camera viewshed cones may be displayed on a map in various colors, transparency levels and toggled on or off as desired for a single, multiple, or all cameras. Camera viewshed coverage may be displayed as a simple viewshed cone projecting from the camera location oriented in the direction and field of view the camera is directed. Camera viewshed cones may rotate around the GPS location of the camera on the map as the camera moves appearing as a flashlight beam, rotating, widening, or narrowing based on the cameras field of view. Viewshed cones may extend a user or system defined distance from the camera location, such as 10 or 20 miles. The C&C system may display one or more types of camera viewshed layers. An example of a viewshed layer may resemble a 2D or 3D flashlight beam (a cone shaped projection that is narrow at the camera location and widens as it extends in distance from the cameras location) projecting from one or more cameras in the direction the camera azimuth is currently oriented, displaying the cameras field of view as the flashlight beam's width and length on the map. When a 3D map is displayed, the flashlight beam may also incorporate the camera's elevation setting in displaying the vertical viewshed area(s) to be displayed on the map. A camera's flashlight beam may display on the map as a filled area comprising some transparency level. This type of layer may include locations that the camera cannot view because it may not consider obstructions such as mountains, valleys, trees, or structures. As another option, a viewshed layer may only display each camera flashlight beam's outline.

VIEWSHED AND VIEWSHED EDITING—The C&C system may provide the ability to generate, edit and/or show highly detailed camera viewsheds using Light Detection and Ranging (LiDAR) data and viewshed mapping software (integrated into the C&C system or utilizing some other system). Utilizing LiDAR and viewshed mapping software may allow obstructions to be considered that may block a camera's ability to view certain areas. The detailed viewshed coverage may display everywhere a camera can see ground level, see above common obstructions (such as treetops) or show viewshed wherever a camera views some arbitrary height above ground level. The use of a camera view at a height above ground level (for example, 500 feet) may be advantageous in detecting objects of interest such as a smoke column or aircraft. This arbitrary height above ground may be user or system defined and adjustable on a user, user group or system wide basis. Common obstructions include, but are not limited to, mountains, valleys, trees, buildings, or other structure types such as towers, grain silos, water towers and lookouts. LiDAR viewshed mapping may be incredibly useful in determining placement of camera site locations and/or when users or systems (including the C&C system) need to know which cameras can or cannot view a specific location or object of interest. As an option, LiDAR viewsheds may only display viewshed coverage within a cameras current field of view or display viewshed coverage everywhere a camera (or site with more than one camera) can possibly view (up to 360 degrees) regardless of which direction a camera is currently oriented. These highly detailed viewsheds may be toggled on and off per camera, site, geographic area or globally. The C&C system may also incorporate a viewshed editing tool to allow a user, the C&C system or AI to review one or more images or panoramic images from one or more cameras to highlight certain areas within the images or panoramas where the camera may or may not be able to view due to some sort of obstruction. As another option, the C&C system may incorporate LiDAR mapping data in addition to or in lieu of the area selector tool to allow a user, the C&C system or AI to modify a camera viewshed based on a cameras location data such as GPS location, height above ground and structure type. Laser range finders may be incorporated into camera housings or mounted close to cameras and used to detect any obstructions close to the camera's location and mark those obstructed areas within the C&C system and camera viewsheds. These highly detailed viewsheds may be editable through the C&C system by a user or AI to ensure camera viewsheds are as accurate as possible. Viewsheds may be utilized to determine which cameras can see a specific point and may be helpful for situations such as a call to 911 to report a fire where a dispatcher needs to quickly determine which cameras can view the location of interest and/or an area a certain height above ground over the location of interest. As an option, the system may utilize the location input by a user or the system to determine all cameras that can view the location and turn some or all cameras towards the location of interest.

HOVER OVER IMAGE/ARROW/MAP MOVING TARGET LINE—To improve location awareness in the C&C system, when a user moves a cursor over the display interface, the C&C system may track the cursor movement and cursor location to perform certain actions based on the cursor location. When a cursor is hovered over a camera image tile, that camera's icon or arrow icon may change and highlight a different color on the map area on the display interface. That camera's viewshed and target lines may also be displayed in a user or system defined color while a user is hovering over that camera's image with a cursor. Moving the cursor off the camera image tile, may cause the camera's icon or arrow icon to no longer be highlighted a different color and the viewshed and target lines to disappear. Another C&C system feature is the ability to briefly hover over a camera's icon or arrow icon on the map portion of a display interface with a cursor in order to highlight a border around that corresponding camera's image within a larger image tile set. As another option, when hovering over the camera's icon or arrow icon, the C&C system may automatically expand that camera's icon or arrow icons' corresponding image tile into a larger image on the display interface to improve viewability. In cases where sites have more than one camera at a location, initially hovering over the icons associated with the site may expand camera image(s) for one of the camera's (for example, camera A). To expand the camera image(s) for additional cameras at the site, the user may briefly move their cursor off the icons associated with the site then hover over the site icons again. Each time a user moves their cursor off a set of camera icons and back onto them, the displayed image(s) may change if more than one camera is present at the arrow location. Another useful cursor or input tracking function of the C&C system is the ability to move a cursor horizontally across a camera image or panorama and have the corresponding map display a target line that represents where in the image the cursor is located on the map. As the user moves a cursor across the image to various locations of interest, the target line on the map moves accordingly to show the user what direction those locations of interest are in relation to the camera site. The C&C system may analyze each camera image captured and utilize orientation data from camera software to determine the exact elevation and azimuth coordinates for the center and each corner of a captured image. By doing this, the C&C system may correlate cursor location (when hovering or clicking on an image) to a map heading or a geographic location. This functionality may be utilized in all portions of the C&C system including within images, videos, panoramas, timelapses and various other functions of the system. Additionally, an azimuth bar may display in, above or below an image showing the azimuth headings that correspond to various sections within the image. For example if an images field of view is 60 degrees starting at an azimuth of 0 degrees and ending at an azimuth of 60 degrees, the azimuth bar may display 5 degree marks (5, 10, . . . 55, 60) to help users determine what azimuth specific sections of the image correspond to on a map in relation to the camera site.

CAMERA CONSOLE PAGE—Within the C&C system users may access one or more camera console pages through a webpage URL or an application on their personal device. Camera console pages allow users to view one or more cameras, move and control one or more cameras or view additional information from one or more cameras or locations. When a user accesses a camera console page, multiple viewing areas may be displayed, including, but not limited to, a camera image or video viewing area, a map area, a camera movement log, a chat window, a weather data window, a C&C system generated panoramic image (up to 360 degrees) and a link to direct a user to a historical image archive where historical images or videos may be viewed, downloaded or shared. Camera console pages may be navigated to within the C&C system a multitude of ways, including, but not limited to, clicking directly on a camera's image tile on any page, searching for a camera name in a search field, clicking a camera icon on a map, or by clicking a camera image in an image quilt or timelapse.

MAP/CAMERA MOVEMENT AND CONTROL—When using the C&C system, a user, the C&C system, a web server or a $3^{rd}$ party system may control one or more camera(s) using a variety of methods including, but not limited to, clicking one or more desired target location(s) on an image, panorama, video or 2D/3D map, clicking a button, clicking and holding a mouse button, double tapping with an input device, finger motions on a device with a touch screen, dragging a cursor across an image, panorama, video or 2D/3D map and then releasing the mouse button to define one or more target location(s); drawing some sort of shape such as a polygon, circle or rectangle on an image, panorama, video or a 2D/3D map to allow one or more target location(s) to be defined; or by inputting GPS coordinates, an address, a point of interest (such as a 911 call location), a satellite heat detection, combination of azimuth/elevation/zoom levels or other location identifying data into a search field. The C&C system may display a camera zoom bar proximate to the camera image to allow users to quickly increase or decrease zoom levels. The C&C system may allow users to click on a location on a 2D or 3D map or image to control camera movement or turn cameras to that location to capture image(s) or video. This system is not limited to controlling a single camera at a time—for example, a user or system may request one or more image(s) or video(s) from every camera within a defined radius of a desired target location. Once the user request is received by the C&C system, the C&C system may then command the cameras to simultaneously reorient themselves to view the specific location. Once reoriented, each camera may return one or more requested image(s) or video(s) to the system or user. As another option, all cameras within the defined area may be set to patrol mode and oriented at the target location, programmed to then return one or more image(s) of the target location(s) based upon user set, or dynamic time interval(s) (such as a new image every 30 seconds) to provide situational updates of the target location. The C&C system may schedule other camera movements and image captures during idle camera time or optimize image capture sequencing by capturing images close to each other or at similar zoom levels before moving to other areas to eliminate wasted camera movement cycles or inefficiencies.

TRACKING USER MOVEMENTS VIA A MOVEMENT LOG—The C&C system may incorporate a camera movement log allowing users, based on user access levels, to see other users' camera movements within the system and to document camera movement reasons. The camera movement log may be displayed on the camera console page in a table format and record all camera movements. Data fields within the camera movement log for each camera movement may include, but not be limited to name, username, company name, camera movement message, user phone number, pan/tilt/zoom orientation of the camera, a timestamp of when the movement occurred and the movements priority level. When a user clicks on an image or panorama on a camera console page, a camera movement request popup box may display on the screen. The movement request popup box may allow a user to type in the reason for moving the camera, display their username, phone number, and mark the intended camera movement as high or low priority. After the user clicks a confirm button in the camera movement popup box, a data entry may be recorded in the camera movement log and the C&C system may send a command to the camera to move to the user's desired location they clicked on or highlighted the area of on the image. Once a user confirms the intended initial camera movement, the C&C system may display a popup alerting the user they have enabled live viewing mode and display a countdown timer. During the countdown, the user may continue to move the camera as many additional times as needed within the set time interval (such as 60 seconds) before another camera movement request popup may be required to move the camera again. During the live viewing mode, even though a user is not required to comment on every camera movement, all the users' movements may be recorded. Live viewing mode allows users to optimize the view of their object of interest by making additional camera orientation adjustments without requiring a confirmation for each adjustment. If the user in live viewing mode attempts to move the camera in a radically different direction than the initial movement, for example over 90 degrees to the right or left, that action may disable the set time interval and immediately display a new camera request popup to document the reason for the new camera movement. Additionally, users may be able to click a button, icon, or 'x' to end live viewing mode prior to the set time interval expiring if they no longer desire to control camera movement. During live viewing mode, the C&C system may increase the frame refresh rate for the user so the user may see immediate camera movements or enable live video playback for a temporary period of time for that user. The camera movement log may display all historical camera movement position settings and users may be able to return a camera to a previously viewed location by clicking on a historical position setting within the displayed movement log. Camera movements may be labeled and/or uniquely identified within the movement log. This may be very useful to quickly move between multiple objects of interest (such as spot fires). Users may also request images and/or generate a patrol mode request or an image feed quilt based on the different prior movement locations.

WEATHER DATA INCORPORATED INTO THE SYSTEM—The C&C system and camera console page may collect, store and display weather data from a variety of weather stations in various locations within the C&C system. Weather data may be inserted directly into image frames from the camera software or inserted during post processing by the C&C system or image acquisition Servers. By inserting weather data into image frames before storing the images, historical image playbacks may display weather data without needing to correlate image and weather data capture timestamps. As another option, the system may display weather data in addition to or separately from camera images including during timelapses or historical playback. As another option, users may be able to click a button or icon to view available weather data at the camera location. As another option, weather data may be displayed from the nearest weather station to a camera location and may alert the user that the weather data provided is not at the camera's location. For displayed weather data that is not at a camera's location, the C&C system may show the user how far away, in what direction and the elevation difference between the camera and weather station locations. Weather stations may provide the C&C system with various types of data including but not limited to temperature, humidity, wind speed, wind direction, wind acceleration, and precipitation. Each data type may include measurements for current, average, minimum, maximum values over certain time periods and may include historical graphs and timelapse playbacks. As another option, the C&C system may incorporate weather data from private or public weather stations as well as $3^{rd}$ party weather data systems such as MesoWest. The C&C system may allow a user to toggle on and off a layer showing one, some, or all available weather stations on a map. As an option, a user may select the type of weather data displayed and/or the source of the weather data. As another option a user may be able to draw a rectangle, polygon or circle on a map to display all available weather stations within the user defined area. As another option, a user may be able to display a timelapse of the weather data for the selected area.

PANORAMIC IMAGES—The C&C system may display panoramic images or videos in multiple locations within the C&C system including on the camera console page, within quilts, timelapses, or any other desired location within the system. Panoramic images providing up to 360-degree views may be created by combining two or more images and/or videos captured from one or more cameras. The images may be processed, aligned, and combined to each other in such a manner that a combined image or video with a wider field of view (up to 360-degrees) is generated, displayed, stored, and/or made available to a user or system. Users and/or the C&C system may have the ability to determine the desired detail level for panoramic images by selecting image quality and scan ranges for camera azimuth, elevation and zoom level. The C&C system may automatically increase or decrease the quantity of images captured based on the requested panorama detail level. As an option, panoramas may initially display within the C&C system based on a user's browser or window size. A user may be able to expand the panorama to a larger image size with more detailed imagery and navigate left, right, up and down to view the desired locations within the panorama in more detail by clicking a button, icon or selecting an image. Additionally, once a panorama is expanded, a user may still click anywhere on the expanded panorama or image to move the camera to that location. The C&C system may generate panoramas by scheduling one or more camera(s) to complete a user, system, machine, or AI defined sequence of movements. The C&C system may then collect all the images or videos captured from the movement sequence and may align and combine them.

Now referring to FIGS. 4A through 4C, various camera movement sequences are shown. FIG. 4A shows sequential clockwise or counter-clockwise image captures 400. In this embodiment, a camera sequentially captures images 400-1 through 400-N at pre-established sequential camera azimuths. FIG. 4B shows a non-sequential image capture 425 wherein a priority request 425-2 causes the images to be taken out of sequence. At 425-1 image 1 is captured and then at 425-3 image 2 (in image position 3) is captured after which image 3 (in image position 2) is captured 425-4 followed by image 4 being captured 425-5. FIG. 4C shows a stacked image capture arrangement 450 where multiple images are taken at same camera azimuths but different elevations. As shown, two images are captured at the same first camera azimuth but at different elevations 450-1, 450-2, a second set of images is captured at a second camera azimuth and different elevations 450-3, 450-4, a third set of images is captured at a third camera azimuth and different elevations 450-5, 450-6 and a fourth set of images is captured at a fourth camera azimuth and different elevations 450-5, 450-6 and so on through 360 degrees.

Images may be aligned vertically and/or horizontally in relation to each other to create the panoramic image. During this post-processing phase, the C&C system may manually or automatically adjust image parameters such as the resolution, scale, tone, contrast, sharpness, dynamic range, noise, and gain of each individual image or video to achieve a smooth composite of the combined images in the creation of the panorama. This may be especially important when using thermal, infrared, or multispectral cameras, as most of these camera types provide an image displaying relative ranges of the lowest to highest temperatures within the image frame, not absolute temperatures. Once a panorama is displayed, users may click anywhere on the panorama to move a camera to that location or a user may simultaneously move and zoom a camera by holding down a modifier key such as the CTRL key, clicking and holding a mouse button at one corner of the desired location the user wants to view on the panorama, dragging the user's mouse to the opposing corner of the desired area to form a rectangle, then releasing the mouse button, the same task may also be performed using a mobile device and finger inputs. Such actions may cause the C&C system to simultaneously move and zoom the camera to display the desired location. Panoramic images may have timelapse functionality where a user may display a sequence of historical panoramic images over a given period of time. As another option the C&C system may utilize one or more cameras to provide up to a 360-degree live panoramic video. For example, four cameras, each with a 90-degree field of view, may simultaneously capture video and the C&C system may stitch the individual videos together to provide system users or the public with live 360-degree situational awareness from the camera site. These live videos may be immediately displayed within the C&C system or stored and displayed later upon user request at a user desired selectable playback speed. As another option a user may search for a location or click a location on a map to display panoramic images from multiple camera sites with the selected location centered within each panorama. Once the panoramas are displayed, the user may be able to move and zoom each camera by directly selecting and clicking on areas within the panoramas.

Figure 5:
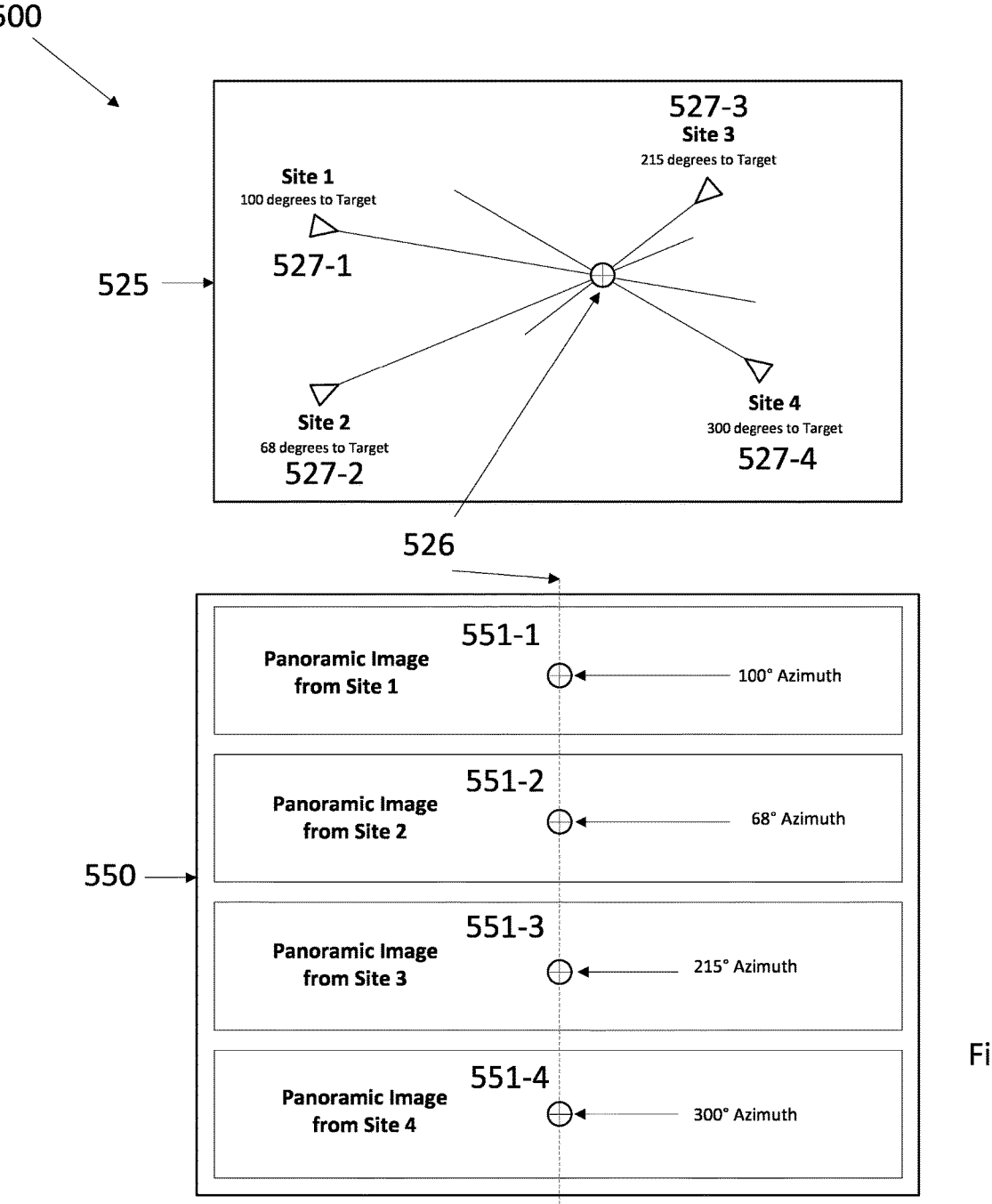
FIG. 5 illustrates how panoramic images from various sites may be aligned to a target location and displayed for users' rapid situational awareness according to the embodiments of the present invention.

FIG. 5 shows how panoramic images from various sites may be aligned to a target location and displayed for users' rapid situational awareness according to the embodiments of the present invention. As shown, a system map 525 and user display 550 cooperate to achieve rapid situational awareness for users. Via the system map 525, a user can to search a map or click on a desired target location 526. Once the target location 526 is selected or otherwise identified, cameras 527-1 through 527-4 are directed by the system on the target location 526 for purposes of generating panoramic images. The user display 550 may then display multiple generated panoramic images 551-1 through 551-4 based on pre-established parameters (on this instance, the azimuth angle).

PANORAMA COMBINING 2 OR MORE CAMERAS—The C&C system may generate a panorama by combining images from 2 or more cameras at the same location proximate to one another. This may be useful at certain locations where a single camera may have local obstructions preventing 360 views and one or more additional cameras is needed. For example, two or more cameras may need to be mounted to different sides of a fire lookout building to provide a full 360-degree viewshed. The two or more cameras may each capture one or more images or videos of certain azimuth ranges less than the full 360-degree range and then the C&C system may process, combine, and display the new 360-degree panorama. This may be useful to maximize situational awareness. AI and other detection techniques may utilize this method of combining images to ensure all areas are be scanned for objects of interest, such as new fire starts.

PANORAMA PATROL MODE—The C&C system may allow users to setup camera patrol mode patterns within the system. Patrol mode patterns allow one or more camera(s) to cycle between various user or system defined locations, returning one or more image(s) or video(s) from each location during each patrol cycle. Users may initiate patrol modes by clicking a button on a camera console page to enable patrol mode creation/modification or a user may hold down some sort of key modifier (such as the CTRL key) to enable the ability to select multiple points within a panorama and then click a button to use those points to build a camera patrol pattern. Users may have the ability to set patrol image or video capture rates, time delay between each capture location and the overall patrol cycle frequency.

Figure 6:
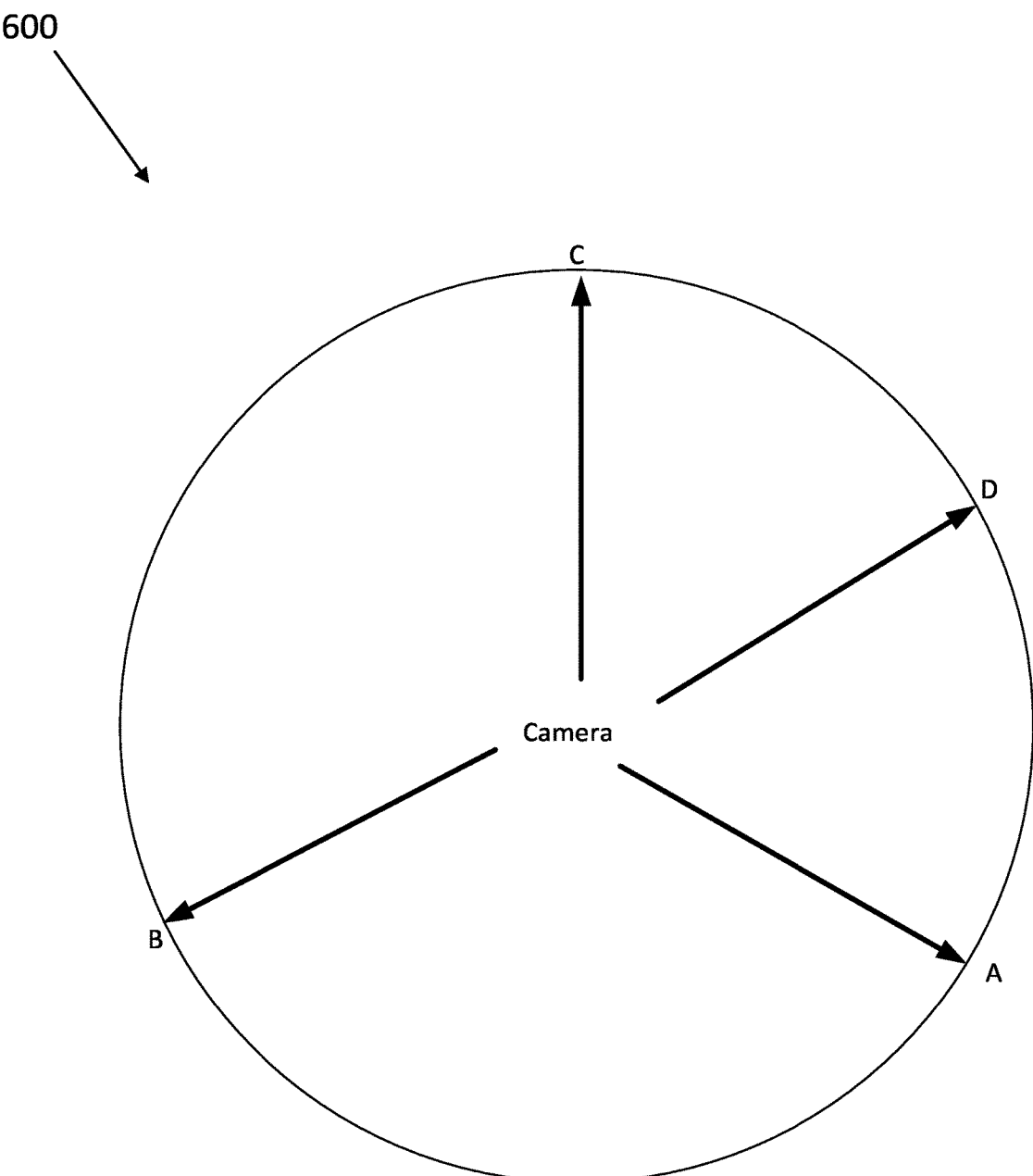
FIG. 6 illustrates how image acquisition servers may schedule image feeds for multiple users from a camera according to the embodiments of the present invention.

CAMERA VIRTUALIZATION/IMAGE FEEDS—The C&C system may have the ability to virtualize camera operation, image collection and/or playback to create the appearance of more cameras at a location than are actually present. Virtualizing allows scheduled image or video acquisitions of different locations from a single camera and may return a unique image or video per virtual camera feed after a set or dynamic time interval based on the number of camera movement requests in the image acquisition scheduler. Virtual camera feeds may maximize camera functionality by simulating more cameras than are physically installed at a location and may be useful to prevent user contention. For example, when multiple users have conflicting needs to view different locations from the same camera, virtual camera feeds may provide each user imagery of their desired location without other users being impacted. The C&C system may accomplish this by commanding the camera to quickly cycle back and forth between the different user specified locations, capturing an image at each location and then returning the images to each user within a set time period (e.g., every few seconds). FIG. 6 shows a camera 600 moving through target locations in order A, B, C and D. Virtualized cameras within the C&C system may display virtual feed identifiers such as 1, 2, 3, 4 or A, B, C, D on a camera console page allowing users to quickly move back and forth between various virtual camera feeds or may just display the feed locations in a new or existing panel. As another option all virtual camera feeds may be displayed somewhere within a camera console page simultaneously including colored boxes that correspond to matching camera target lines on a map so a user can quickly view which image corresponds to which direction a camera is directed. A quilt of camera feeds may also be generated by clicking a button (including full screen and timelapse functionality) showing all desired areas from a given location simultaneously.

GENERATE IMAGE QUILTS—MAP/SEARCH/CLICK IMAGE—The C&C system may utilize user, system, or AI inputs to generate image quilts. Image quilts are system generated displays of images, camera feeds, panoramas, or videos captured from one or more cameras then arranged in some sort of horizontal and/or vertical image grid, where the image grid may be any number of horizontal images wide by any number of vertical images tall and combined into a single display interface. Image quilts may display one or more near real-time or historical images of one or more target locations from one or more cameras. Image quilts may be generated based on a user or system selected area. FIG. 7 shows a flow chart 700 detailing how a user may search for a target location or click on a map to cause cameras to turn to view the target location and generate an image quilt according to the embodiments of the present invention. At 705, a user or AI searches for a target location and selects a target location on a map or a group of cameras. At 710, the system determines which cameras are proximate the target location. At 715, the system commands the cameras identified at 715, to direct at the target location. At 720, four subject cameras are shown directed at the target location. At 725, the system displays each of the images 725-1 through 725-4 from the four cameras on the display in a quilt format.

Figure 8:
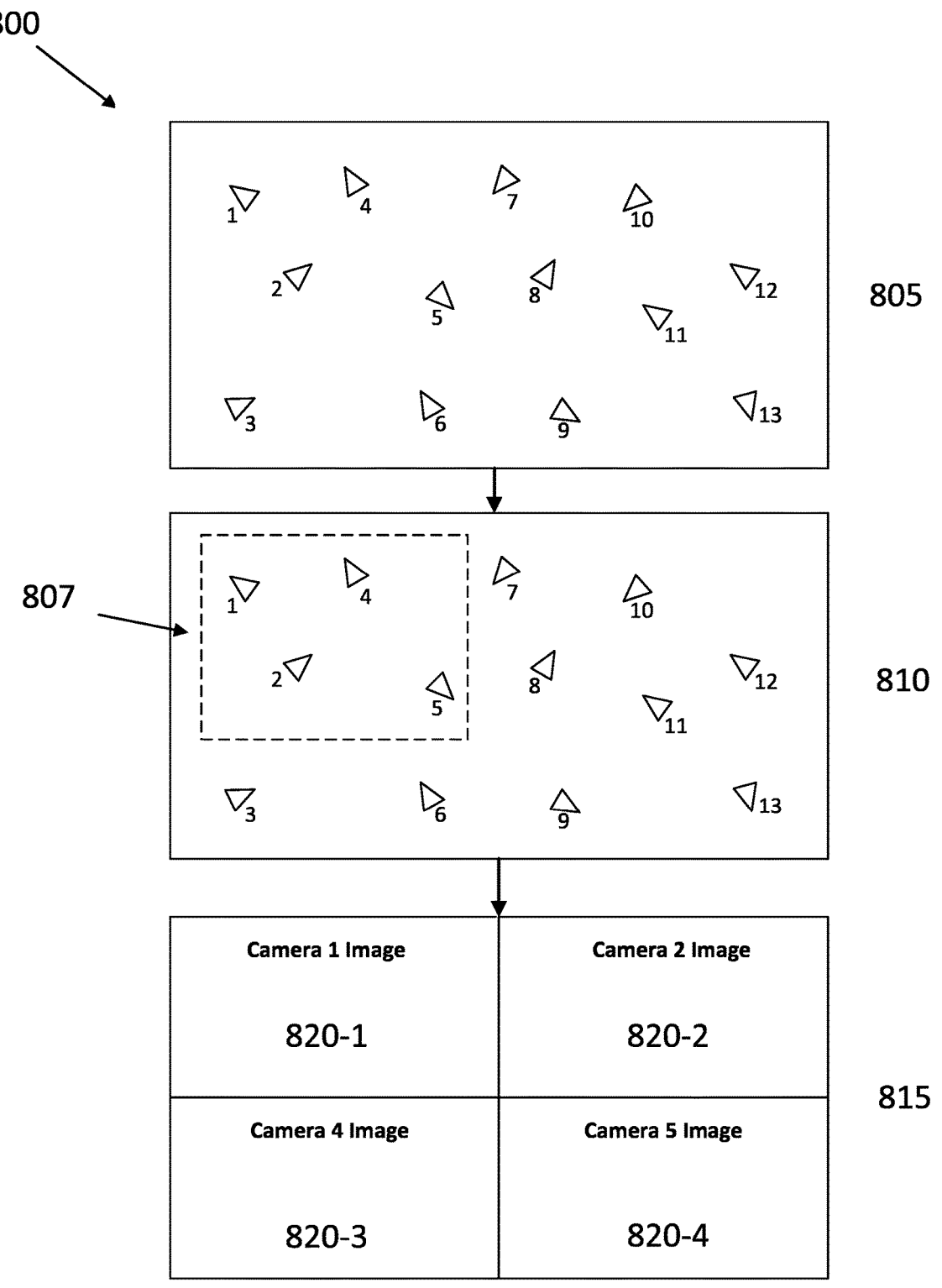
FIG. 8 illustrates a flow chart detailing how a user may select a group of cameras on a map and generate an image quilt according to the embodiments of the present invention.

As an option, as shown in FIG. 8, a user may generate an image quilt using a map displaying camera locations, where the user may include or exclude various cameras as desired using some sort of perimeter drawing tool such as a rectangle, circle, or polygon to display whatever the camera is currently directed. FIG. 8 shows a flow chart 800 detailing how a user may select a group of cameras on a map and generate an image quilt according to the embodiments of the present invention. At 805, a user views a field of cameras on a system display. At 810, the user selects certain of the cameras—shown by box 807 setting a perimeter about cameras 1, 2, 4 and 5). At 815, the images 820-1 through 820-4 from each of cameras 1, 2, 4 and 5, respectively, are displayed in a quilt format.

As another option the user may include or exclude cameras by clicking on individual or groups of camera icons on the map, or the user may be able to select or deselect camera images by utilizing a search bar or clicking on camera images within a group of camera images or an image quilt.

Once an image quilt is generated by the system or a user, the image quilt may be shareable with other system users or the public. The created image quilt may be displayed on the same webpage or browser tab or may be displayed on a new webpage or browser tab or an application on a users' mobile device. After an image quilt is generated, quilts may still be modified by the user whereas the user may continue to add or remove individual or groups of cameras using a map, search bar, or cameras may be removed by clicking on a camera image within the quilt, or by clicking some sort of button displayed on top of or near a camera image to be removed. The C&C system may automatically organize the image quilt display based on the quantity of images included in the quilt to maximize screen use. As another option, users may have the ability to increase or decrease the size of one or all images using an image sizing tool such as a slider bar. As another option users may be able to click a button to toggle between various image layout templates such as a layout with 2 large images and 8 smaller images, or the user may be able to select layout templates from a drop-down menu. Layouts may arrange images where some images may be much larger or smaller than other images to emphasize or deemphasize certain images in the quilt. Users or the system may have the ability to select the image quilt's image sorting and display method to determine where images are displayed on the image grid such as displaying images in alphabetical order, distance from a user, distance from an object of interest's location, most camera views, most logged in users, most social media shares, or any other desired sorting method. Additionally, users may be able to custom sort their quilt images by clicking a button and/or clicking and dragging images around on the quilt display to the user's desired locations.

QUILT TIMELAPSE/SHAREABILITY/CUSTOMIZATION—Once an image quilt has been generated, a user may click a button to initiate a historical playback of one, some, or all the images in the image quilt simultaneously. The user or system may select the desired image quilt time-lapse playback duration from a drop-down menu to view durations of time, such as: the last 5 minutes, 30 minutes, 1 hour, 6 hours, or 12 hours. As another option, users may select more advanced time-lapse playback methods with the ability to view longer time durations, set start and/or stop dates and times, set the total duration of the playback, adjust the frame rate playback speed such as playing back frames at the same frame rate the frames were captured, or only displaying one frame for each historical period of time such as one frame per minute, hour, or day. Additionally, the frame delay rate may be set, which is the amount of time a historical image frame is displayed for a user before the system displays the next image frame. As another option, image filtering options may be available to filter what images are displayed by one or more camera(s) based on criteria chosen by the user, such as objects of interest or most recently moved cameras. Individual images within a quilt may be expanded to full screen or collapsed into the quilt at any time by clicking an image or button, including during time-lapse playback of the quilt. Camera images and image quilts may be shareable by copying and sharing the system generated URL or by clicking a share button to share the quilt with C&C system users or the public via any desired method including, but not limited to, email, text message and social media. The displayed image quilt may be displayed within a web browser or application. Quilts may also be utilized during emergency situations such as a 911 call. For example, an emergency dispatcher may have the ability to click on a map location and cause the C&C system to immediately command all cameras within a certain distance of the clicked location to capture one or more images of the desired location and generate an image quilt displaying multiple angles of the target location of interest simultaneously.

CAMERA CALIBRATION METHODS—The C&C system may provide a mechanism to calibrate cameras so the C&C system can accurately correlate each camera's location and orientation position with map displays, object of interest locations, panoramic image generation, viewsheds, digital elevation model overlays, AI, and general C&C system use. Camera calibration items include, but are not limited to, GPS location, elevation, height above ground level, horizontal azimuth clocking, and vertical axis levelness. Cameras may need calibration for a multitude of reasons including, but not limited to, poor GPS location accuracy, incorrect height above ground slightly off level or rapidly deployed. Cameras may be calibrated by users, the C&C system or AI. The C&C system may perform camera calibration through various methods including, but not limited to, a person physically mounting an orientation detection and calibration device to an installed camera and utilizing sensors within the device to detect and report the cameras orientation data to the C&C system, where the C&C system may then make any necessary offset adjustments within the C&C system. Another calibration method within the C&C system may allow a user to click on multiple points within a camera image or panorama and then click on the matching points on a map. Specific locations may include, but are not limited to, buildings, mountain peaks, roads, structures, the horizon, or other easily identifiable objects that appear in both the image and the map. Once locations are matched up between the camera image and the map, the C&C system may utilize an algorithm to determine the camera axis offset variances and then digitally adjust the variances to align the map to the camera orientation or vice versa.

GPS—QUILTS, TRACK USERS/EQUIPMENT & USER UPLOAD IMAGES—Another embodiment of the current invention may be to capture, store, track and display geographic location data of system users, field resources (such as firefighters, fire engines, bull dozers, water tenders and aircraft) and members of the public. Geographic location data may be imported manually or automatically by a user, a user's device, the C&C system, an external system, or AI. Geolocations may be captured through a user's IP address, global positioning system (GPS) receiver, LoRaWAN GPS tracker, a C&C system mobile application, a third-party application such as the Android Team Awareness Kit (ATAK) or a user's cell phone or tablet's location services.

C&C SYSTEM MOBILE APPLICATION—The C&C system may include mobile and/or web applications for users capable of performing certain functions including, but not limited to, one or more of the following: logging into the C&C system, enabling or disabling GPS tracking, updating user account information, linking field resources to a C&C system user (such as equipment, or aircraft), communicating with other system users via text or voice chat (on a per camera, per company, per incident, or system wide basis), uploading imagery and/or videos from a user's location to the C&C system, controlling and moving cameras, generating panoramic images, generating/modifying/viewing image quilts (including the ability to display a quilt of camera images within close proximity to the user by the click of a button), sharing imagery and location data (with other C&C users within the system, or externally to the public via social media, text message, and email), marking an object of interest on a map within the C&C system (such as a fire), and requesting field resources to be sent to the users specific location such as aircraft, equipment or personnel. In addition to an application for C&C system users, a publicly accessible application may provide much of the same functionality and incorporate public cellphone locations and imagery into the C&C system maps as another layer to allow the rapid sharing of situational awareness data during emergencies. The application may also allow users to scan a QR code to automatically assign themselves to an object of interest, incident, team or a map layer. This may be useful during emergency events where resources are coming from different locations and need C&C system access but have not had a user created in the system.

DISPLAYING FIELD USER LOCATION DATA AND IMAGERY—Once the C&C system captures a user's mobile device location, the user's location may be displayed on a map with some sort of icon. Icon types may vary based on the type of user, or field resource. For example, a hand crew firefighter's location may display as a person with a shovel, a user in a fire truck may display as a firetruck icon, a user in a water tender may display as a water truck icon, a user in a bulldozer may display as a dozer icon and a user in an airplane may display as an airplane icon. The C&C system maps may allow users to toggle on and off different user type layers. For example, one C&C system user may only want to view airplanes and fire engines while another user may only want to see firefighters on hand crews. User locations may continuously update, or only update for a specified amount of time, or be manually updated by a user, or be updated by the system when necessary. C&C system user's or the public may have the ability to upload images or videos into the C&C system with their mobile devices for other system users or the general public to view. Users may have the ability to determine each images sharing level, for example a firefighter user may want to share an image of a car accident or house on fire only with other firefighters but want to share less explicit images with the public. Some field resources such as fire engines may be equipped with $3^{rd}$ party GPS sensors and those sensors may be able to be queried through an API and fed directly into the C&C system. Additionally, aircraft utilize Automatic Dependent Surveillance-Broadcast (ADS-B) to broadcast an aircraft's GPS position, altitude, callsign and other information to receivers on the ground and in other aircraft. This data may also be integrated into the C&C system through an API so emergency commanders as well as firefighters in the field can track firefighting aircraft on the map to see exactly where air resources are located at any given time. In addition to tracking an aircraft's location, whenever an aircraft is within a certain range of one or more camera(s), the one or more camera(s) may automatically initiate a new camera feed that follows the aircraft, taking pictures or video as the aircraft flies along to capture retardant drops and their effectiveness at suppressing the fire.

GPS ICONS MAP—User, field resource and/or public user location icons may be displayed on one or more maps within the C&C system. By clicking on an icon, a text and/or image box may pop up on the map displaying data such as username, some sort of alpha numeric identifier, company name, GPS location coordinates (that may be sharable with other users by clicking a button or link within the C&C system), and an image or video thumbnail including a timestamp showing when the image or video was captured. Clicking on the image or thumbnail within the pop up may expand the image or video to full screen. As another option, C&C system users may be able to click on a GPS trail button within the pop up and cause the C&C system to display the historical GPS trail locations of the user or field resource. Icons may be displayed along the users GPS trail on the map showing time stamps for when the user or field resource's device reported their location into the C&C system or may show another icon type whenever the field user reported in any image or video. The image or video may be clickable and viewable. Additionally, a C&C user (such as emergency command personnel and resource dispatchers) may be able to toggle on an individual or group of field resources, (such as a group of bulldozer's) historical GPS trail(s) to show the progression of field resources (such as where bulldozer(s) have previously cut fire line) and then a C&C user may draw a new line or path on the map which may then be transmitted directly to a user assigned to a field resource (such as a bulldozer) operators' mobile device to show the operator the desired GPS route where to proceed next (such as where to cut new fire line). Text or audio communications with additional details may also be sent to the operators' mobile device along with the new GPS route through the C&C system.

USER IMAGES IN C&C SYSTEM MAP—As another embodiment of the invention, user locations and user images may be displayed within the C&C system in manner similar to how the C&C system displays camera sites and camera site imagery. When a C&C system user or the public uploads an image into the C&C system, an icon representing the location of the person performing the upload may display on a map as well as a tile of the image. By clicking on a user's location or a user's image icon, a popup may be displayed that includes items such as a thumbnail of the user's image, the user's name, company, phone number or other important user data like the image timestamp, GPS coordinates, viewing azimuth and elevation of where the image or video was taken. One or more user location icons and images may be displayed on a map simultaneously. In addition to being displayed on a map, user image tiles may also be displayed on the display interface in some form of image grid. By hovering over an image with a cursor or by clicking on an image tile, the icon representing where the image was taken may change color, change size or the icon itself may change to show the viewer exactly where that image was taken. As another option, one or more user's locations may be overlaid on top of images or videos using digital elevation models and/or AI to help show where field resources are in relation to an object of interest. By uploading user or public images into the C&C system, this may provide unparalleled situational awareness for system users. As an example, public users may be able to use their mobile device to upload imagery into the C&C system for first responders to see such as a fire in an area or a down tree on power lines.

AIRCRAFT THERMAL IMAGERY OVER FIRE—As another embodiment of the current invention, aircraft may be deployed over an object of interest. For example, an aircraft may be deployed to a fire to visualize the size, location, perimeter, intensity, and fuel loads within the fire's perimeter and in the path of the fire. One or more aircraft may capture imagery from one or more optical and/or thermal camera(s) affixed to each aircraft. The captured visual data may be stored, analyzed, prioritized, and displayed within the C&C system as one or more layers. C&C system users or the public may be able to access this data based on their user permission levels. AI may be utilized to analyze the aircraft data to detect any changes in a size, intensity, any newly detected changes (such as fire hot spots) as well as to manipulate and overlay the data on a 2D or 3D map for users to view. Additionally, once captured, this data may be sent through the C&C system to field resources within or near the object of interest (such as a fire) to give the field resources near real-time situational awareness (such as a fires location and behavior).

AIRCRAFT COLLECTING DATA & RELAYING INTERNET—In addition to visual capture devices, the one or more aircraft may also be equipped with one or more wireless antenna(s) allowing the aircraft to relay voice, data, and location information from field personnel through the aircraft to one or more ground stations, then to the C&C system. Information may also travel in the reverse order where voice, data and location information may be sent from a C&C system user through the Internet to a ground station then relayed through an aircraft to the field personnel. Each ground station may utilize one or more antenna(s) capable of tracking one or more aircraft simultaneously. Ground stations may utilize some method to continuously align the ground station antenna(s) in relation to the aircraft(s) as they fly and/or utilize omni-directional antenna(s) or antenna array(s) on the ground station(s), aircraft(s) or both to maintain constant connectivity between the ground station and the aircraft while it is in the air. Aircraft ADS-B may be utilized by the ground stations to track the exact location of an aircraft at any given time and the system may utilize this data to calculate the azimuth and elevation angles the ground station antenna(s) must be oriented to maintain data connectivity with the aircraft. Additionally, communication between a ground station and an aircraft and/or an aircraft and a ground station may be relayed through a satellite. Utilizing aircraft with the C&C system may be useful when relaying critical information between field resources and incident commanders, particularly in remote areas where traditional handheld radios and cellular devices have poor connectivity or dead spots. All types of aircraft may be utilized including manned and/or unmanned drones, fixed wing aircraft, and rotorcraft. The aircraft may also act as a UHF/VHF repeater for field personnel's handheld and vehicle mounted radio communications.

DIGITAL ELEVATION MODELS WITH OVERLAID MAPS AND IMAGES—One or more image(s) and/or video(s) extracted from one or more camera(s) may be utilized with 3D digital terrain elevation models and map layers. Satellite imagery, topographic, road, state, county, forest service boundaries or any other desired type of map may be overlaid over a digital terrain elevation model, then one or more camera images and/or videos may be overlaid on top of the digital terrain elevation model and map layer. By projecting camera image(s) and/or video(s) onto digital elevation models and including various map overlays, users' situational awareness may be greatly improved by providing them with a 3D view of what the camera is viewing as if they were standing at the camera in real life. This 3D view may also have other data projected onto the digital terrain elevation models including, but not limited to, landmarks such as roads, towns, utility lines, gas lines, lakes, rivers, vegetation fuels or any other desired data via any $3^{rd}$ party systems or databases. LiDAR data may be used to give highly detailed digital elevation maps including displaying individual trees and other obstructions such as buildings. Digital terrain elevation models may also provide users with the ability to a click on a location in an image, video, digital elevation model or map, then display that location on the respective other types of maps or images. For example, if a user clicks on a location within an image or panorama, the C&C system may display that specific location on a 2D or 3D map as shown in FIG. 9 As another option, a user may be able to select a location on a map or digital elevation model and the C&C system may then display the selected location within an image or panorama.

FIG. 9 shows a flow chart 900 detailing how a user may identify a location on a map from a camera image according to the embodiments of the present invention. At 905, a user selects a location (fire 907 as shown) within a camera image. At 910, the system may use precise camera location data and camera position settings in conjunction with a digital elevation model to determine the user-selected location. Alternatively, or in addition, at 915, the system compares landmarks in the image to a stored map to determine the user-selected location. At 920, the system displays the location selected by the user.

ARTIFICIAL INTELLIGENCE/MACHINE LEARNING—The C&C system may rely on AI and ML to automate and optimize various tasks within the system. This reliance includes, but is not limited to, controlling cameras, detection and tracking of objects of interest (such as fires) and extracting object of interest boundaries from images. AI and/or ML may also be utilized to identify, detect, measure, locate, sort, alert, and track objects of interest movements, changes in size as well as other notable changes (such as a fires temperature or smoke color over time). The C&C system may also use historical images previously taken and stored in an archive to train the AI, analyze and predict an object's future change in direction, position, and size. Images and/or panoramic images and/or video may be sent to one or more (ML) and/or AI models within the C&C system or to an external $3^{rd}$ party source (a Modeler or The Modeler). A Modeler may be trained to recognize specific objects of interest, such as fire, smoke, open areas, vegetation, roadways, bodies of water, utility lines, or any other landmark. The Modeler may also classify objects of interest. If objects of interest are detected within one or more camera image(s) and/or video(s), the Modeler or the C&C system may generate an alert and/or display one or more camera image(s) and/or video(s) on a user interface as shown in FIG. 10.

FIG. 10 shows a flow chart 1000 detailing how AI may be utilized to analyze images to detect, locate and alert users when a new object of interest is identified according to the embodiments of the present invention. At 1005, the system commands a camera or series of cameras to capture an image. The location of the image may be randomly selected, user selected, system selected or AI selected. At 1010, AI analyzes the image comparing it to previous images of the same location. At 1015, it is determined by AI (or other system) if an object of interest has been identified. Objects of interest (e.g., fire, smoke, etc.) may be entered into a system database for reference by the AI or other system. If, at 1015, no object of interest has been identified, the system loops back to 1005 to capture a new image for analysis. If, at 1015, am object of interest has been identified, ay 1020, the system uses elevation modeling or landmarks to determine the location of the object of interest. At 1025, a GPS location of the object of interest is determined. At 1030, the system sends an alert to relevant personnel including imagery of the object of interest and its location. At 1035, the system displays the new object of interest on a display interface and adds it to a map.

The display of alerts and/or camera image(s) and/or video(s) may be specific to a location or geographic area defined by a user. The C&C system may utilize historical image(s) and/or video(s) taken prior to an event to link new objects of interest to an existing incident or send an alert that an object of interest has been discovered outside of a predefined or dynamically defined area. Example events could include the identification of an object of interest or the creation of an incident such as a new spot fire outside of a predetermined fire perimeter boundary, or the presence of smoke in a location where smoke is not normally present, or a vehicle in a location where one was not expected or should not be. The Modeler or user may provide the location of a recognized object to the C&C system, which may then instruct one or more camera(s) to turn towards the object of interest and begin recording images and/or videos. A Modeler may also provide the C&C system with object of interest movement data so one or more camera(s) may dynamically track the object of interest. Once the Modeler validates it has recognized an object of interest, the camera image(s) and/or video(s) of the object of interest may be sent back to a previous Modeler or forwarded to a different Modeler which may extract the edges of the object of interest and may store the data in a database. The Modeler may then match the image(s) and/or video(s) and edges of the object of interest to geographical locations, and then may store the location data in a database. The data may then be visualized using mapping software or on a webserver and may be used in conjunction with other components mentioned herein. The Modeler may gather data from multiple data sources, including, but not limited to, live and historical weather data gathered from weather stations, ground coverage data, fuel mapping, 3rd party models, and location data from other cameras to predict how a specific object of interest may change over time. The Modeler may also use the new prediction data to provide key events, such as the time when a fire is expected to reach a user specified point of interest (POI) (towns, buildings, roads, utility infrastructure, etc.). The previously gathered location data of a specified object of interest may then be used to derive analytics regarding a change over time. In the case of a fire, some examples of statistics that may be derived include the rate of spread, estimated acreage, and weather information.

Figure 11:
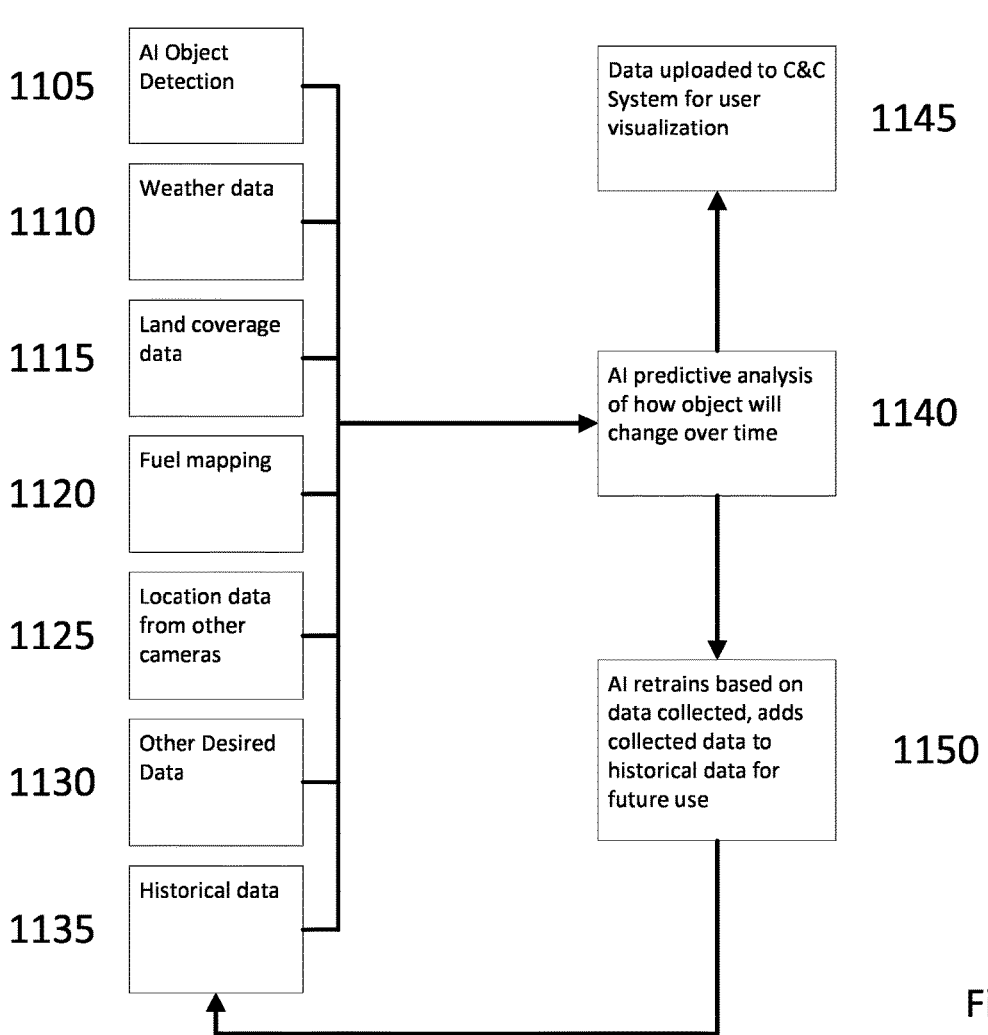
FIG. 11 illustrates a modeler schematic detailing how AI may be able to predict object of interest changes over time and become more accurate over time as more data is captured according to the embodiments of the present invention.

FIG. 11 shows a modeler schematic 1100 detailing how AI may be able to predict object of interest changes over time and become more accurate over time as more data is captured according to the embodiments of the present invention. Based on a detected object 1105 (e.g., AI detected object), the system may use weather data 1110, land coverage data 1115, fuel mapping 1120, data location from proximate cameras 1125, other data 1130 and historical data 1135 to trigger AI predictive analysis on the object 1140. The system may upload the predictive analysis 1145 and/or the AI may be retrained 1150.

Figure 12:
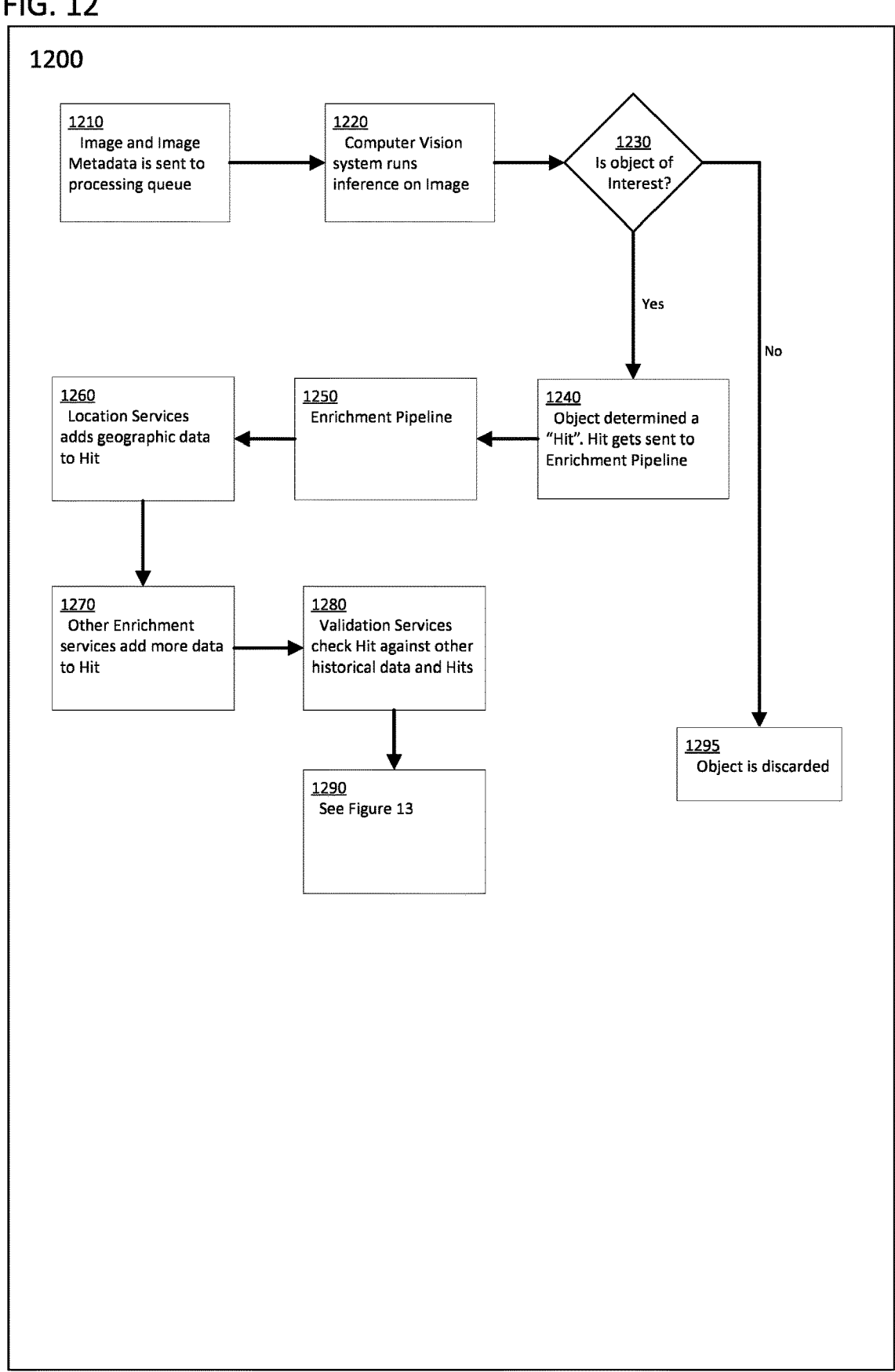
FIG. 12 illustrates a schematic flow chart detailing how images are evaluated to be objects of interests "Hits", metadata and geographic data is added.

As shown in FIG. 12, the system may utilize a stream of data processed by the Computer Vision (CV) model to further confirm validity of an image as an object of interest, to enrich data, such as adding or updating associated geographic location data, inference of other process and unprocessed images and image metadata as shown in 1230 and 1280, or through backend processes designed to analyze multiple time-series events, including but not limited to a Recurrent Neural Network (RNN), AI applications, or other algorithms. The algorithms may also be utilized to enrich data outputted by the CV model, such as determining the geographical location of an Incident, identifying landmarks in the images, predicting various characteristics of the fire, predicting resource requirements, analyzing rate of spread of the Incident over time, or other enriching tasks. At 1210 images and image metadata enters the system for evaluation. At 1220 the CV model evaluates images for objects of interest. At 1230, trained AI searches for changes in images using existing Filters, images and/or other data (e.g., previous images, previous detections, geocoordinates, terrain elevations, maps) to identify possible objects of interest (e.g., column of smoke). If the object is determined to not be of interest, it is discarded as shown in 1295. If the object is determined to be a possible object of interest, at 1240 the object is classified as a "Hit" and enters the enrichment pipeline. At 1260 geographic data is added to the previously collected metadata and image. At 1270 any additional data identified as being relevant to the Hit is added to the Hit. At 1280, the Hit is validated against historical data and other Hits before being further processed.

Figure 13:
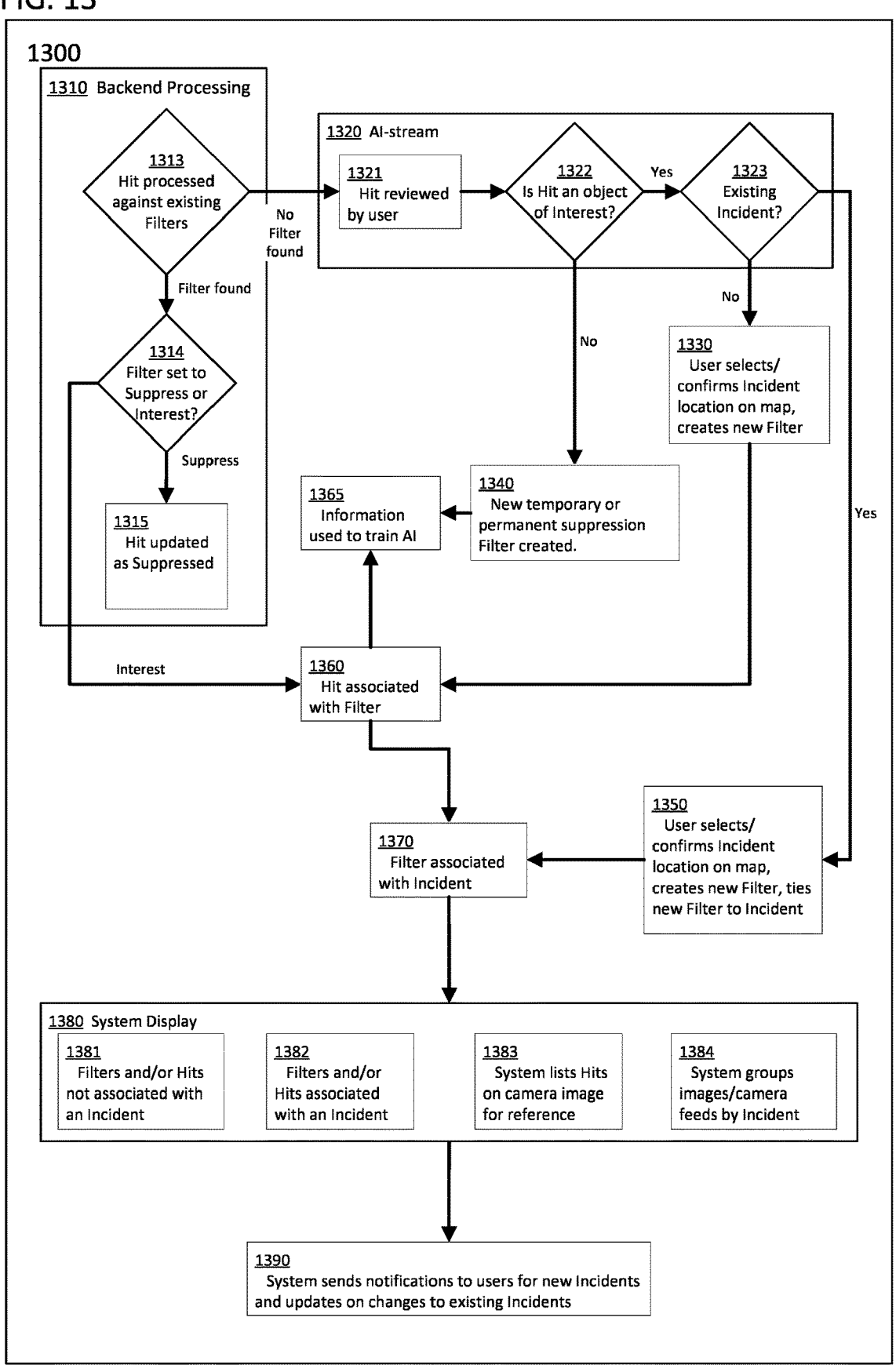
FIG. 13 illustrates a schematic flow chart detailing how AI may be able to assist with filtering out certain "Hits" from being identified as "Incidents."

FIG. 13 shows a schematic flow chart 1300 detailing how AI assists with filtering out certain "Hits" from being identified as "Incidents." In one embodiment, the system herein identifies each fire as an "Incident". Filters are used to control which images or detections (deemed "Hits") to include in an Incident. Hits include items like wood stoves, clouds or smokestacks that need to be filtered out. It is very labor intensive and/or impossible for one or more users to manually review every image with a Hit and identify the basis for the Hit. Consequently, as detailed herein, AI is trained to review previously created Filters to remove non-incident related Hits from the user's interface. In one embodiment, if a Hit has been tagged to be suppressed by an existing Filter rule, the system disregards it, and a user need not review it. Depending on the embodiment, Filters can be created to cover specific locations, large areas, colors of smoke, be active for certain times of the day, certain days, expire, not expire, etc. If a Hit has not been previously identified, the system draws a red box around the Hit (or otherwise highlights it) and displays it on a user's monitor. In one embodiment, trained AI generates a probability percentage of the Hit being an actual fire. For each red box that appears, a user must make a determination if the Hit is a fire or not. If it is, the user ties the Hit to an existing Incident (if one exists) or creates a new Incident that is reported to emergency personnel. For existing Incidents, the Hit is matched to an existing Filter (i.e., status updates or the Incident now being viewable from a different camera). These Hits are added to the images already available to users for monitoring the Incident. For new Incidents, new Filters are created so the AI can associate future Hits with the new Incidents, leaving users to focus energy elsewhere.

As shown in FIG. 13, at 1313, within the backend processing module 1310, the Hit is compared to previously identified images, data and/or instructions. The previous information is deemed a Filter. If the Hit matches an existing Filter, at 1314, the Filter is set to suppress or interest. At 1315, the Hit is marked as suppressed and no notifications are sent to users. If the Filter is set to interest, the chart 1314 advances the Hit to 1360 where the Hit is associated with a Filter. If, at 1313, the Hit does not match an existing Filter, the Hit is sent to an AI-stream user interface 1320 (comprising steps 1321-1323). At 1321, the Hit not matched to a Filter is displayed and reviewed. At 1322, it is determined if the Hit is an object of interest. At 1322, if the Hit is an object of interest, at 1323, it is determined if the Hit is related to an existing Incident. If so, at 1350, the user creates a new Filter, and ties or associates the new Filter with existing Incident. If, at 1323, the Hit is not related to an existing Incident, at 1330, a new Filter and Incident are created and, at 1360, the Hit is associated with the Filter. If the Hit is not an object of interest, at 1340, a new temporary or permanent suppression Filter is created. At 1365, the information from 130 is used to train the AI. After 1350 and 1360, at 1370, the Filter is associated with an existing or newly created Incident, at which point the system or user verifies Incident data, such as location, responsible parties, or other incident data. Upon Incident creation and/or verification or an update of associated data, such as location, at 1390, the system sends notifications to users with information such as location, image data, Incident ID, nearby cities, population impacted, rate of spread, expected burn path, weather data, or other relevant incident information via notification channels including but not limited to email, SMS, push notifications, automated voice calls, or other user-defined channels. Notifications may be delivered based on user defined periods of time and user defined areas. Periods of time may comprise, for example, one minute, one hour, one day, one week or indefinitely. Areas may include, but are not limited to, polygons drawn around areas and/or radiuses from communities or locations, counties, states or countries.

A system display module 1380 comprises the display of Filters and/or Hits not associated with an Incident 1381; the display of Filters and/or Hits associated with an Incident 1382; the display of Hits on a camera image or a set of images 1383; and the display of groups of images or camera views by Incident.

SUB SYSTEMS—C&C systems may consist of one or more standalone systems to service specific geographic areas such as a state or country. As another option, two or more different C&C systems may work in conjunction with each other and share cameras, camera imagery and data feeding into each other or into a master C&C system. For example, each state within a country may utilize a different C&C system. Once a user accesses the C&C system for a state, the user may, based on their permissions, be allowed to view and/or access C&C system cameras from other states on the same map to improve functionality across various jurisdictions such as state lines.

Although the invention has been described in detail with reference to several embodiments, additional variation and modifications exist within the scope and spirit of the invention as described and defined in the following claims.

We claim:

1. A monitoring system, comprising:
a plurality of digital image-capturing devices, said digital image-capturing devices positioned in an area for which monitoring is desired;
one or more displays for presenting images captured by one or more of said digital image-capturing devices and image data to users of said monitoring system;
a user interface; and
control software utilizing artificial intelligence configured to: (i) review Hits to determine if such Hits are objects of interest; (ii) determine if said Hits are related to an existing Incident; (iii) if determining a Hit is related to an existing Incident, create a new Filter and associate said new Filter with said existing Incident; and (iv) if determining that said Hit is unrelated to an existing Incident, create a new Filter, associate said Hit with said Filter and use such information to further train said artificial intelligence.

2. The monitoring system of claim 1 wherein said digital image-capturing devices comprise static, pan, tilt, and/or zoom functionality.

3. The monitoring system of claim 1 wherein said area for which monitoring is desired includes wild fire zones.

4. The monitoring system of claim 1 further comprising one or more APIs to communicate with 3rd party systems.

5. A monitoring system, comprising:
a plurality of digital image-capturing devices, said digital image-capturing devices positioned in an area for which monitoring is desired;

one or more displays for presenting images captured by one or more of said digital image-capturing devices and image data to users of said monitoring system;

a user interface; and control software utilizing artificial intelligence configured to: (i) cause said plurality of digital image-capturing devices to capture images in a pre-established pattern; (ii) cause said pre-established pattern to be interrupted when necessary based on user inputs seeking one or more priority images; (iii) cause said pre-established pattern to continue once said one or more priority images are captured; (iv) review Hits to determine if such Hits are objects of interest; (v) determine if said Hits are related to an existing Incident; (vi) if determining a Hit is related to an existing Incident, create a new Filter and associate said new Filter with said existing incident; and (vii) if determining that said Hit is unrelated to an existing Incident, create a new Filter, associate said Hit with said Filter and use such information to further train said artificial intelligence.

6. The monitoring system of claim 5 wherein said digital image-capturing devices comprise static, pan, tilt, and/or zoom functionality.

7. The monitoring system of claim 5 wherein said area for which monitoring is desired includes wild fire zones.

8. The monitoring system of claim 5 further comprising one or more APIs to communicate with 3rd party systems.

9. A monitoring system, comprising:

a plurality of digital image-capturing devices, said digital image-capturing devices positioned in an area for which monitoring is desired;

one or more displays for presenting images captured by one or more of said digital image-capturing devices and image data to users of said monitoring system;

a user interface; and control software utilizing artificial intelligence configured to: (i) cause said plurality of digital image-capturing devices to capture images in a pre-established stacked pattern; (ii) select and capture images using a first group of two or more cameras at a first azimuth but different elevations; (iii) select and capture images selectively using additional groups of two or more cameras at same azimuths and different elevations; (iv) continue step (iii) until images covering 360 degrees have been captured; (v) generate a panoramic image using said captured images; (vi) review Hits to determine if such Hits are objects of interest; (vii) determine if said Hits are related to an existing Incident; (viii) if determining a Hit is related to an existing Incident, create a new Filter and associate said new Filter with said existing Incident; and (iv) if determining that said Hit is unrelated to an existing Incident, create a new Filter, associate said Hit with said Filter and use such information to further train said artificial intelligence.

10. The monitoring system of claim 9 wherein said digital image-capturing devices comprise static, pan, tilt, and/or zoom functionality.

11. The monitoring system of claim 9 wherein said area for which monitoring is desired includes wild fire zones.

12. The monitoring system of claim 9 further comprising one or more APIs to communicate with 3rd party systems.

13. A monitoring system, comprising:

a plurality of digital image-capturing devices, said digital image-capturing devices positioned in an area for which monitoring is desired;

one or more displays for presenting images captured by one or more of said digital image-capturing devices and image data to users of said monitoring system;

a user interface; and control software utilizing artificial intelligence configured to: (i) receive information regarding a target location; (ii) identify certain digital image-capturing devices nearest to said target location from said plurality of digital image-capturing devices; (iii) cause said identified certain digital image-capturing devices to direct at said target location; (iv) cause identified certain digital image-capturing devices to capture images of said target location; (v) display said captured images in a quilt format; (vi) review Hits to determine if such Hits are objects of interest; (vii) determine if said Hits are related to an existing Incident; (viii) if determining a Hit is related to an existing Incident, create a new Filter and associate said new Filter with said existing Incident; and (iv) if determining that said Hit is unrelated to an existing Incident, create a new Filter, associate said Hit with said Filter and use such information to further train said artificial intelligence.

14. The monitoring system of claim 13 wherein said digital image-capturing devices comprise static, pan, tilt, and/or zoom functionality.

15. The monitoring system of claim 13 wherein said area for which monitoring is desired includes wild fire zones.

16. The monitoring system of claim 13 further comprising one or more APIs to communicate with 3rd party systems.

17. The monitoring system of claim 13 wherein users or AI provide said information regarding a target location.

18. A monitoring system, comprising:

a plurality of digital image-capturing devices, said digital image-capturing devices positioned in an area for which monitoring is desired;

one or more displays for presenting images captured by one or more of said digital image-capturing devices and image data to users of said monitoring system;

a user interface; and control software utilizing artificial intelligence configured to: (i) receive information regarding a target location selected by a user from within an image; (ii) determine said user-selected location using: (a) precise camera location data and camera position settings in conjunction with a digital elevation model and/or (b) a comparison of landmarks in said image to a stored map; and (iii) display said target location on a map; (iv) review Hits to determine if such Hits are objects of interest; (v) determine if said Hits are related to an existing Incident; (vi) if determining a Hit is related to an existing Incident, create a new Filter and associate said new Filter with said existing Incident; and (vii) if determining that said Hit is unrelated to an existing Incident, create a new Filter, associate said Hit with said Filter and use such information to further train said artificial intelligence.

19. The monitoring system of claim 18 wherein said digital image-capturing devices comprise static, pan, tilt, and/or zoom functionality.

20. The monitoring system of claim 18 wherein said area for which monitoring is desired includes wild fire zones.

21. The monitoring system of claim 18 further comprising one or more APIs to communicate with 3rd party systems.

22. The monitoring system of claim 18 wherein users or AI provide said information regarding a target location.

23. A monitoring system, comprising:

a plurality of digital image-capturing devices, said digital image-capturing devices positioned in an area for which monitoring is desired;

one or more displays for presenting images captured by one or more of said digital image-capturing devices and image data to users of said monitoring system;

a user interface; and control software utilizing artificial intelligence configured to: (i) cause an image of a target location to be captured; (ii) use AI to analyze said captured image by comparing said captured image to previously captured images of said target location; (iii) responsive to an object of interest being detected by said AI in said captured image, determine a location of said object of interest; (iv) transmit alert regarding object of interest to personnel; (v) display said object of interest on a display interface and/or map; (vi) review Hits to determine if such Hits are objects of interest; (vii) determine if said Hits are related to an existing Incident; (viii) if determining a Hit is related to an existing Incident, create a new Filter and associate said new Filter with said existing Incident; and (iv) if determining that said Hit is unrelated to an existing Incident, create a new Filter, associate said Hit with said Filter and use such information to further train said artificial intelligence.

24. The monitoring system of claim 23 wherein step (iii) involves (a) precise camera location data and camera position settings in conjunction with a digital elevation model and/or (b) a comparison of landmarks in said image to a stored map.

25. The monitoring system of claim 23 wherein said location of said object of interest is GPS-based.

26. The monitoring system of claim 23 wherein step (iv) includes transmission of object of interest imagery and location information related thereto.

27. A monitoring system, comprising:

a plurality of digital image-capturing devices, said digital image-capturing devices positioned in an area for which monitoring is desired;

one or more displays for presenting images captured by one or more of said digital image-capturing devices and image data to users of said monitoring system;

a user interface; and control software utilizing artificial intelligence configured to: (i) receive information related to an object of interest; (ii) trigger AI predictive analysis of how said object of interest will change over time, said AI predictive analysis using one or more of weather data, land coverage data, fuel mapping, data location from proximate cameras and historical data to predict how said object of interest will change over time; (iii) upload predictive analysis for user access; (iv) review Hits to determine if such Hits are objects of interest; (v) determine if said Hits are related to an existing Incident; (vi) if determining a Hit is related to an existing Incident, create a new Filter and associate said new Filter to said existing Incident; and (vii) if determining that said Hit is unrelated to an existing Incident, create a new Filter, associate said Hit with said Filter and use such information to further train said artificial intelligence.

28. The monitoring system of claim 27 wherein machine learning occurs based on collected data.

* * * * *